United States Patent [19]
Bessacini et al.

[11] Patent Number: 5,671,139
[45] Date of Patent: Sep. 23, 1997

[54] HIERARCHICAL FUZZY CONTROLLER FOR BEAM RIDER GUIDANCE

[76] Inventors: Anthony F. Bessacini, 83 Birchwood Dr., Narragansett, R.I. 02882; Robert F. Pinkos, 201 Indian Trail, Saunderstown, R.I. 02874

[21] Appl. No.: 498,811

[22] Filed: Jul. 6, 1995

[51] Int. Cl.$^6$ ................................................ G06F 165/00
[52] U.S. Cl. ............................. 364/424.032; 364/423.098; 395/905; 244/3.13; 244/3.15
[58] Field of Search ....................... 364/423.098, 424.032, 364/424.027, 462, 516; 395/3, 900, 905; 318/589; 244/3.1, 3.11, 3.13, 3.14, 3.15, 3.19

[56] References Cited

U.S. PATENT DOCUMENTS

| | | | |
|---|---|---|---|
| 4,732,349 | 3/1988 | Maurer | 244/3.13 |
| 5,080,300 | 1/1992 | Stubbs et al. | 244/3.14 |
| 5,101,351 | 3/1992 | Hattori | 395/905 |
| 5,118,050 | 6/1992 | Arnold et al. | 244/3.19 |
| 5,319,556 | 6/1994 | Bessacini | 364/424.02 |
| 5,429,322 | 7/1995 | Waymeyer | 244/3.15 |
| 5,436,832 | 7/1995 | Bessacini et al. | 364/424.02 |

*Primary Examiner*—Gary Chin

[57] ABSTRACT

A beam rider guidance system for directing a steerable object, such as a torpedo. The guidance system is located at a launching vehicle and senses the bearings from the launching vehicle to a target and to the steerable object as it moves toward the target. Various error signals are then generated and classified into membership functions of different sensed variable membership function sets based upon primary and secondary goals to become fuzzy inputs to a controller that produces fuzzy output control output membership functions from a control output membership function set based upon logical manipulation of the fuzzy inputs. The control system performs this classification and selection according to sometimes competing goals of excluding the torpedo from a particular operating zone while guiding the torpedo in response to a bearing through that operating zone. The selected fuzzy control output membership functions are converted into an output having an appropriate form for control, subject to optional conditioning to prevent unwanted effects and assure good behavior for different tactical parameters.

32 Claims, 15 Drawing Sheets

|   | $e_s$ | | |
|---|---|---|---|
| $\Delta e_s$ | N | Z | P |
| N | PS | PS | – |
| Z | PM | ZE | – |
| P | PL | ZE | – |

|   | $e_s$ | | |
|---|---|---|---|
| $\Delta e_s$ | N | Z | P |
| N | NS | NS | – |
| Z | NM | ZE | – |
| P | NL | ZE | – |

|  | $e_{gp}$ | | | | | | |
|---|---|---|---|---|---|---|---|
| | NL | NM | NS | ZE | PS | PM | PL |
| NL | PL | PL | PL | PS | ZE | NM | NL |
| NS | PL | PM | PS | ZE | NS | NM | NL |
| $\Delta e_v$ ZE | PL | PM | PS | ZE | NS | NM | NL |
| PS | PL | PM | PS | NS | NM | NL | NL |
| PL | PL | PS | ZE | NS | NL | NL | NL |

|  | $e_{gp}$ | | | | | | |
|---|---|---|---|---|---|---|---|
| | NL | NM | NS | ZE | PS | PM | PL |
| NL | PL | PM | ZE | NS | NL | NL | NL |
| NS | PL | PM | PS | ZE | NS | NM | NL |
| $\Delta e_v$ ZE | PL | PM | PS | ZE | NS | NM | NL |
| PS | PL | PL | PM | PS | NS | NM | NL |
| PL | PL | PL | PL | PS | ZE | NS | NL |

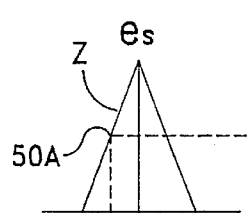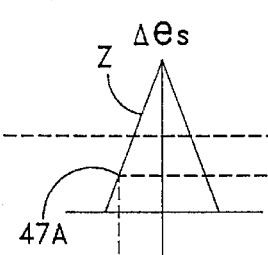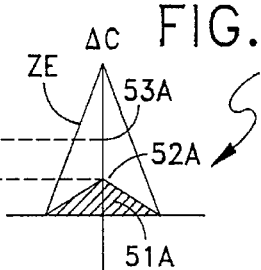
FIG. 8A
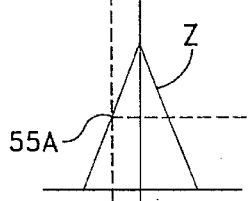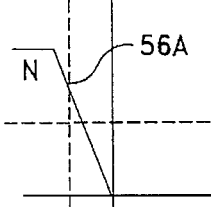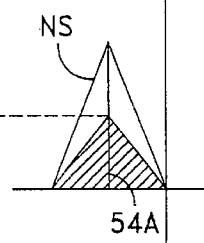
FIG. 8B
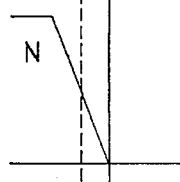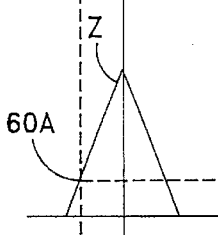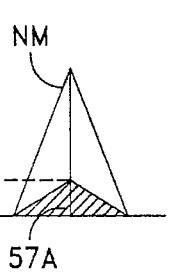
FIG. 8C
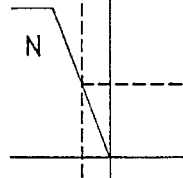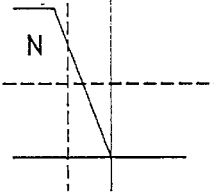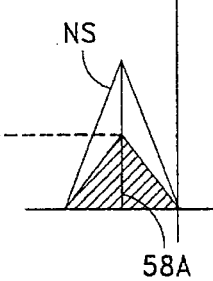
FIG. 8D
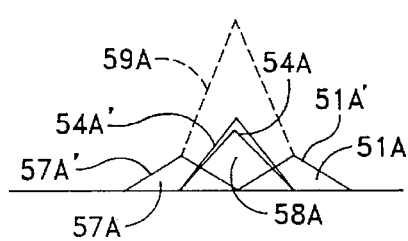
FIG. 8E

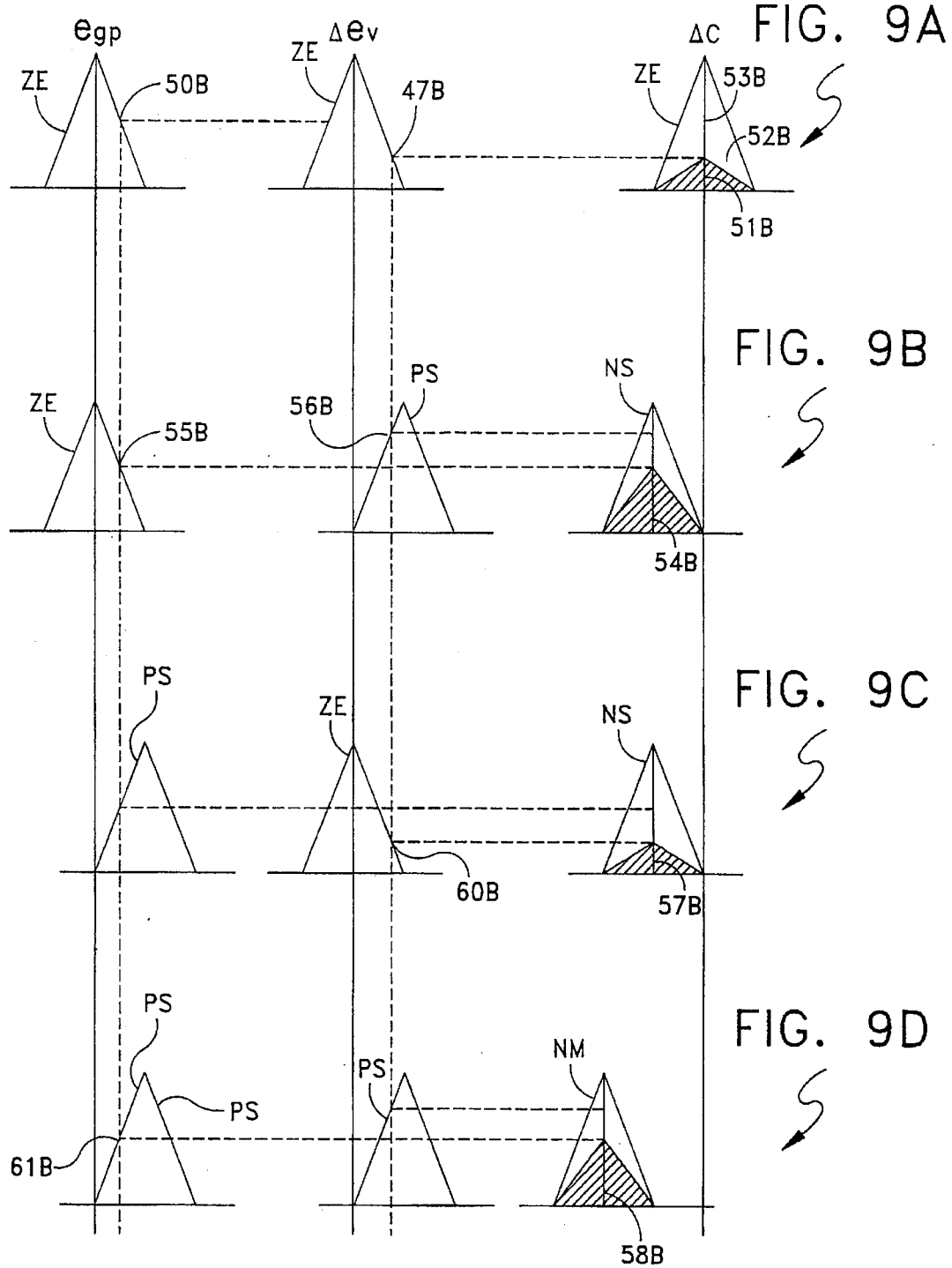
FIG. 9A
FIG. 9B
FIG. 9C
FIG. 9D
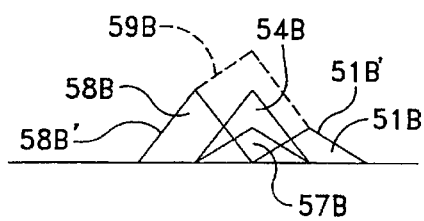
FIG. 9E

HIERARCHICAL FUZZY CONTROLLER FOR BEAM RIDER GUIDANCE

STATEMENT OF GOVERNMENT INTEREST

The invention described herein may be manufactured and used by or for the Government of the United States of America for governmental purposes without the payment of any royalties or therefor.

CROSS REFERENCE TO RELATED APPLICATION

This patent application is co-pending with a related patent application entitled FUZZY CONTROLLER FOR BEAM RIDER GUIDANCE, Ser. No. 08/147,271 filed Nov. 5, 1993, Navy Case No. 74856, of which Anthony F. Bessacini and Robert F. Pinkos are co-inventors.

BACKGROUND OF THE INVENTION

(1) Field of the Invention

This invention generally relates to a control system located at a first, or reference, site for guiding a steerable object from that site toward a second, or target, site. More specifically this invention relates to such a control system that is operable even when both the control system at the first site and the target at the second site undergo independent motion.

(2) Description of the Prior Art

Real time control systems based upon sensory inputs find application in air-, land- and underwater-based vehicles. For example, in a submarine application any of several torpedo guidance systems have been used to guide a torpedo to a target site from a submarine.

U.S. Pat. No. 4,323,025 to Fisher et al. (1982) describes a homing torpedo with an onboard, or autonomous, steering control system that operates in a target search phase or a target acquisition phase. In the target search phase, the control system directs the torpedo along a controlled helical search path. When the torpedo acquires a target, the control system transfers to a target pursuit phase. The control system transfers back to the target search phase whenever target acquisition is lost. It is a characteristic of control system of this type, however, that control from the submarine as a launching vehicle is lost immediately upon launch.

U.S. Pat. No. 5,229,541 to Will et al. (1993) discloses a variant of the foregoing onboard, or autonomous control system in the form of a safety system that deters a homing missile from attacking its launching vehicle. In this embodiment, a tracking circuit on the launching vehicle tracks a torpedo after launch by receiving signals from a transponder on the torpedo. If the control system on the launching vehicle determines that the torpedo has reentered a protective zone on a course homing on the launching vehicle, the control system generates a coded command that it transmits to the torpedo control system acoustically. The torpedo control system responds by altering its course and resuming a search for a target in a sector other than that in which it was acquiring a launching vehicle. In addition upon determining that the weapon is within an activation zone, the control system on the launching vehicle can produce a magnetic field substantially corresponding to the neutralization zone. Sensors on the torpedo respond to its entering that field by neutralizing the weapon detonator.

More recently submarines have included a control system for guiding an acoustic homing torpedo launched from the submarine toward a target over a wire link. The control system used in this application is oftentimes a "beam rider" control system and is located on board the submarine, or at first, or reference site, that guides a torpedo, as a steerable object, along a bearing from the first site to the target, as the second, or target site. As will be apparent, the locations of the submarine and target typically are changing so the bearing line also is changing. When the torpedo comes within the effective range of the homing system, the homing system takes over the steering control function. The wire link disconnects from the torpedo at some point, normally at some maximum wire payout length.

Steerable objects with such homing systems are also characterized by having an external point in front of the steerable object called a "guidance point". This guidance point corresponds to the centroid of the acoustic beam in the case of a torpedo with an acoustic homing device. Generally a beam rider control system operates to maintain the guidance point of the steerable object, such as a torpedo, on the current bearing line from the first, or reference, site to the second, or target, site.

Prior art beam riding control systems for submarine launched torpedoes include a control mechanism, a torpedo model and a communications link to the torpedo, as the steerable object. The torpedo model is a mathematical replica of the torpedo that provides position and status information for post launch guidance operation. The control mechanism utilizes measured contact information, particularly a bearing from the submarine to the target, and torpedo model information, particularly the bearing from the submarine to the guidance point of the torpedo, to generate a command sequence for maintaining the guidance point on the target bearing from the launch platform to the target. These commands are transferred from the submarine to the torpedo through the wire communications link.

Originally, beam rider control systems did not include any mechanism for readily allowing the inclusion of heuristic information into the control system, particularly information about expertise gained through past experience with manual beam rider guidance systems. Also these beam rider control systems normally required an operator to determine whether to issue a particular command to a torpedo and did not automatically generate and issue guidance commands in a continuous fashion.

Other approaches for directing a steerable object from a launch site to a target involve complicated control systems based on sets of differential equations and estimates of input parameters. Such systems operate in response to analytical controllers. However, like prior art beam rider control, systems such analytical controllers are not readily adapted to utilize expert knowledge gained through experience.

An emerging class of control systems called "fuzzy controllers" represent a behavior-based control system in which control actions are computed from collective votes of many independent control procedures or rules that are sometimes referred to as behaviors. U.S. Pat. No. 5,825,380 (1994) to Payton discloses one such system in which the fuzzy controller on board a steerable object receives multiple commands from a plurality of control sources in which each control source corresponds to a behavior which specifies responses to inputs to produce a command output. In this particular implementation, the fuzzy controller generates zones of command values and command preference levels and the commands are sorted according to command values. The system then creates a total profile from the profile of the preference level versus command values of a plurality of control sources by adding the preference level profiles for each control source. The system then determines a peak zone in the total profile having the largest preference level and produces a desired response to the commands indicated by the peak zone. The system is easily integrated within standard control systems, since it allows behavior commands to be combined after they have been processed through a standard control system. This allows the behaviors or the rules to use any derivatives of a control variable as appropriate for their function.

U.S. Pat. Nos. 5,101,351 (1992) and 5,249,126 (1993) to Hattori depict fuzzy controllers for use in steering a vehicle. In the former patent a camera forms an image of the road. An image processor uses the image to calculate the deviation between a plurality of reference points on a road and the direction in which the vehicle is traveling. Each reference point is associated with a plurality of visual points spaced along the road at predetermined distances ahead of the vehicle. The control determines the product of the deviation for each visual point and a membership function indicating the degree of importance attached to each visual point. The membership functions are varied in accordance with the time rate of change of the deviations. The control also calculates a total deviation equal to the sum of the products, and this total deviation is the basis for steering control.

In the later Hattori patent, a fuzzy controller located on a vehicle controls its steering according to a vehicle speed applicable to an autonomous vehicle. Distance information and a deviation of vehicle posture information are derived relative to reference values. The information is further derived from photographing a road surface and is established as a group of fuzzy sets. Membership functions constituting the fuzzy sets are varied according to vehicle speed. This patent discloses a method in which the rules or behaviors can be varied dynamically.

Each of these prior art fuzzy controllers has a common characteristic of being on board the steerable object. Our prior guidance system described in co-pending application Ser. No. 08/147,271 discloses a fuzzy controller located at a first, or reference, site that communicates with a steerable object over a communications link and guides the steerable object from the first site toward a second, or target, site. Consequently, the fuzzy controller is remote from the steerable object. This guidance system operates iteratively and during each iteration determines a set of bearings from the first site to the steerable object and from the first site to the second site. Each set of sensed bearings is classified into first and second sensed linguistic variables that are combined to select one or more control output linguistic variables according to a set of logical guidance rules. The selected control output linguistic variables generate a guidance command based upon associated control output membership functions for transfer over the communications link to control the steerable object.

The object of this system as previously indicated is to place the guidance point of the steerable object onto the bearing line from the first or reference site to the target site. However, it is also possible that the steerable object itself will also align with the bearing line. When this occurs, the torpedo, as a source of noise, may interfere with or contaminate the signals from the target and cause degradation of sensed target information on the first site before the acoustic homing device in the torpedo acquires the target. When this occurs it is necessary for an operator to manually intervene and transfer commands so that the torpedo can deviate from its course until the sensed target information is no longer contaminated. This corrective action detracts from the operator's overall ability to monitor other more supervisory or decision making functions.

SUMMARY OF THE INVENTION

Therefore it is an object of this invention to provide an improved beam rider guidance system at a first site for automatically guiding a steerable object as it moves from the first site toward a second site.

Another object of this invention is to provide a guidance system using an improved fuzzy controller that operates from a launching vehicle for automatically guiding a steerable object toward a target wherein both the launching vehicle and target can undergo independent motion.

Still another object of this invention is to provide a guidance system using an improved fuzzy controller that operates from a launching vehicle for automatically guiding a steerable object toward a target based on competing first and second goals.

Yet another object of this invention is to provide a guidance system using an improved fuzzy controller that operates from a launching vehicle for automatically guiding a steerable object toward a target wherein both the launching vehicle and target can undergo independent motion and the fuzzy controller further limits the location of the steerable object based upon predetermined zones relative to the target bearing from the first site to the second site.

Yet still another object of this invention is to provide a guidance system using an improved fuzzy controller for maintaining a guidance point on a beam rider trajectory through control of the steerable object.

Still yet another object of this invention is to provide a guidance system using an improved fuzzy controller for maintaining the guidance point of a steerable object on a beam rider trajectory control while offsetting the steerable object from the beam rider trajectory.

Still yet another object of this invention is to provide a guidance system with an improved fuzzy controller for use with submarine launched torpedoes that prevents the torpedo from interfering with the process of maintaining a bearing to the target.

Still yet another object of this invention is to provide a guidance system for submarine launched torpedoes that can operate automatically and can readily accommodate diverse operating circumstances.

In accordance with one aspect of this invention, a control system for guiding a steerable object from a launching vehicle toward a target responds to first goal sensed variable signals from various sensors corresponding to the bearings from the launching vehicle to the steerable object and to the target. At least one of the sensed linguistic variables from each of a plurality of stored first goal sensed linguistic variables are retrieved based on competing first and second goals in response to the first goal sensed variable signals. Control output linguistic variables are also selected based on competing first and second goals for conversion into a guidance command that controls the steerable object. This system additionally generates second goal sensed variable signals corresponding to the position of the steerable object with respect to its position relative to a predetermined zone. A second goal sensed variable storage contains second goal sets of sensed linguistic variables for the second goal sensed variable signals. At least one of the sensed linguistic variables from each of the second goal sets is selected based on competing first and second goals in response to the second goal sensed variables. A multi-goal rule based selector based on competing first and second goals produces a control output for forming a guidance command based upon the selection of at least one of the control output linguistic variables in response to the selected sensed linguistic variables from either the first goal or second goal sets when the linguistic variables from the second goal set define the position inside or outside the predetermined zone.

In accordance with another aspect of this invention guidance commands for guiding a steerable object from a launching vehicle to a target include the steps of iteratively determining each of two goal sets of sensed bearings. The first goal set comprises bearings from the launching site to the steerable object and the target. The second goal set comprises bearings that indicate the position of the steerable object with respect to a predetermined zone of positions relative to target sensed bearings. During each iteration, a selection occurs based on competing first and second goals of at least one of each of the first goal set of predetermined sensed linguistic variables pertaining to first goal characteristics of the first goal sensed bearings or of at least one of each of the second goal sets of predetermined sensed linguistics variables pertaining to a second goal characteristic based upon the second goal sensed bearings. A control output linguistic variable is then selected based on competing first and second goals from a predetermined set of control output linguistic variables according to selected predetermined rules in response to the selected sensed linguistic variables from the first goal or second goal sets when the steerable object is inside or outside the predetermined zone.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 7A, 7B 7C and 7D represent rule based matrices incorporated in the multi-goal rule based unit of FIG. 6;

FIG. 8 includes graphs 8A through 8E that depict the operation of the multi-goal rule based unit in FIGS. 3 and 6 during one set of operating conditions;

FIG. 9 includes Graphs 9A through 9E that depict the operation of the multi-goal rule based unit shown in FIGS. 3 and 6 in another set of operating conditions;

DESCRIPTION OF THE PREFERRED EMBODIMENT

Figure 1:
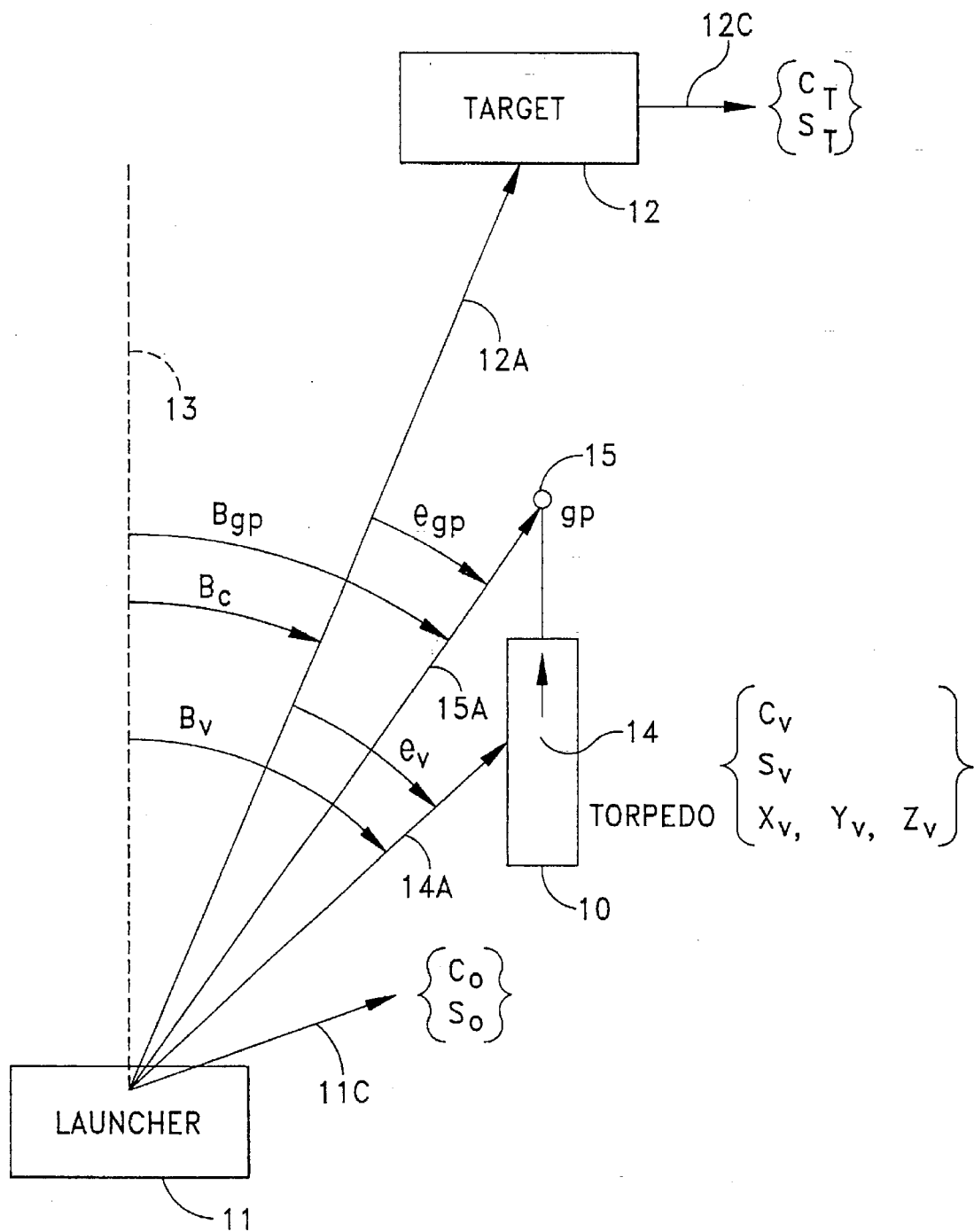
FIG. 1 depicts various instantaneous relationships among a launching vehicle, a target and a steerable object that are useful in understanding this invention.

FIG. 1 depicts instantaneous relationships among a torpedo 10, as an example of a steerable object, that is moving from a first site, shown as a launcher 11, toward a second site, shown as a target 12. The torpedo 10 has a position ($X_V$, $Y_V$ and $Z_V$), a course ($C_V$) and a speed ($S_V$). The launcher 11 is moving along a course $C_O$ and at speed $S_O$ as represented by an arrow 11C while the target is moving along an arbitrary course $C_T$ at an arbitrary speed $S_T$, both of which are unknown and represented by an arrow 12C. Each of the course lines 11C and 12C is normally measured with respect to some reference shown by a dashed line 13 in FIG. 1, typically magnetic north.

Figure 2:
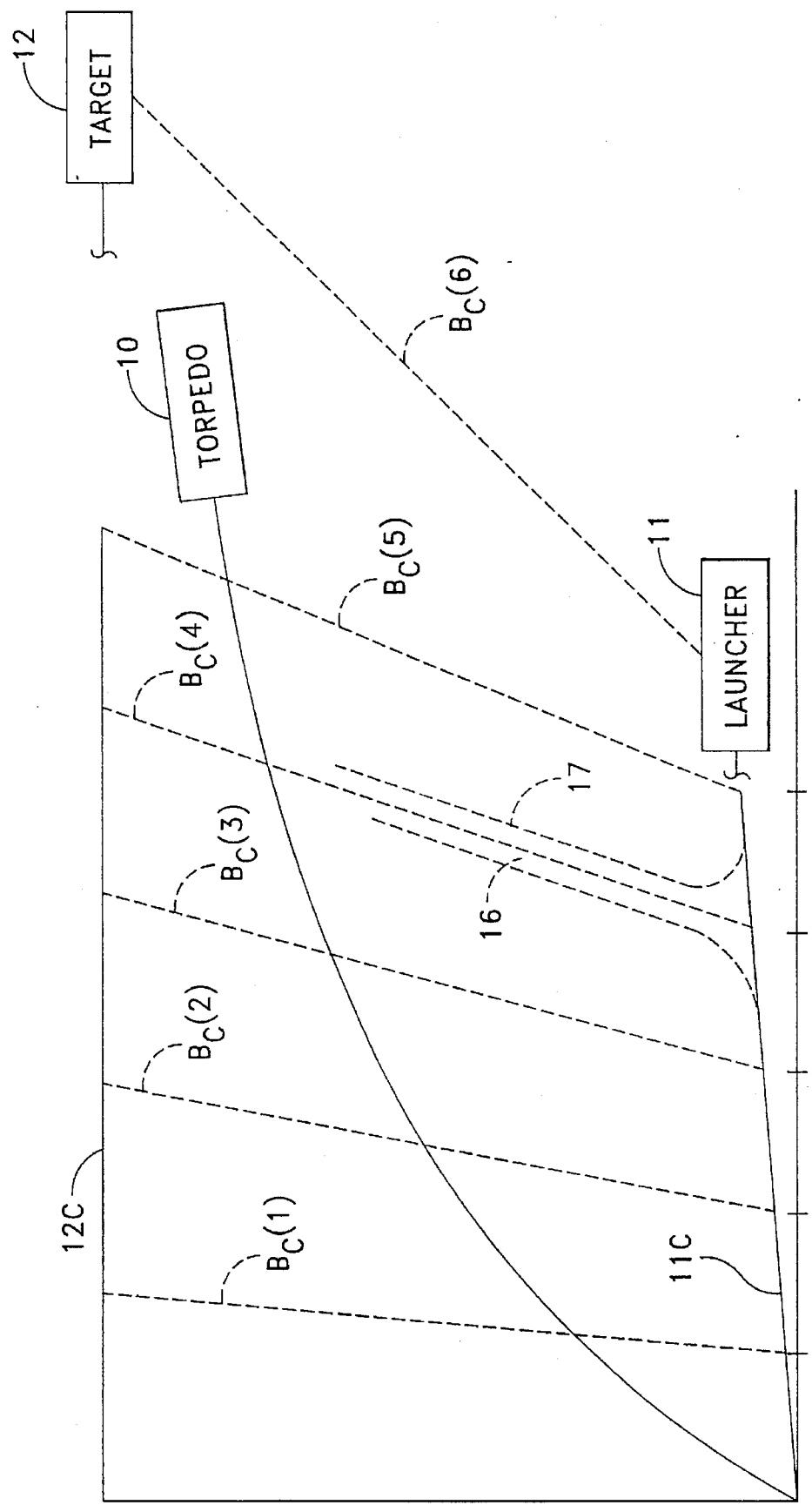
FIG. 2 depicts changes of positions and bearings over time for arbitrary motions of the launching vehicle, a target, a steerable object and a predetermined zone.

FIG. 2 depicts an example of the tracks of the torpedo 10, launcher 11 and target 12 over time, specifically a torpedo track 10C, a launcher track 11C and a target track 12C. FIG. 2 also displays the bearings $B_c$ that could exist over the time bearing interval represented in FIG. 2. They are designated as $B_c(1)$ through $B_c(6)$.

If the torpedo 10 has a homing apparatus, such as an acoustic homing apparatus, the guidance system uses two bearing angles associated with the torpedo 10. One is a bearing to a center point 14 of the torpedo 10; the other, a bearing to a guidance point (gp) 15. As previously indicated, the guidance point 15 can correspond to the centroid of the acoustic beam of the internal acoustic homing apparatus.

Figure 3:
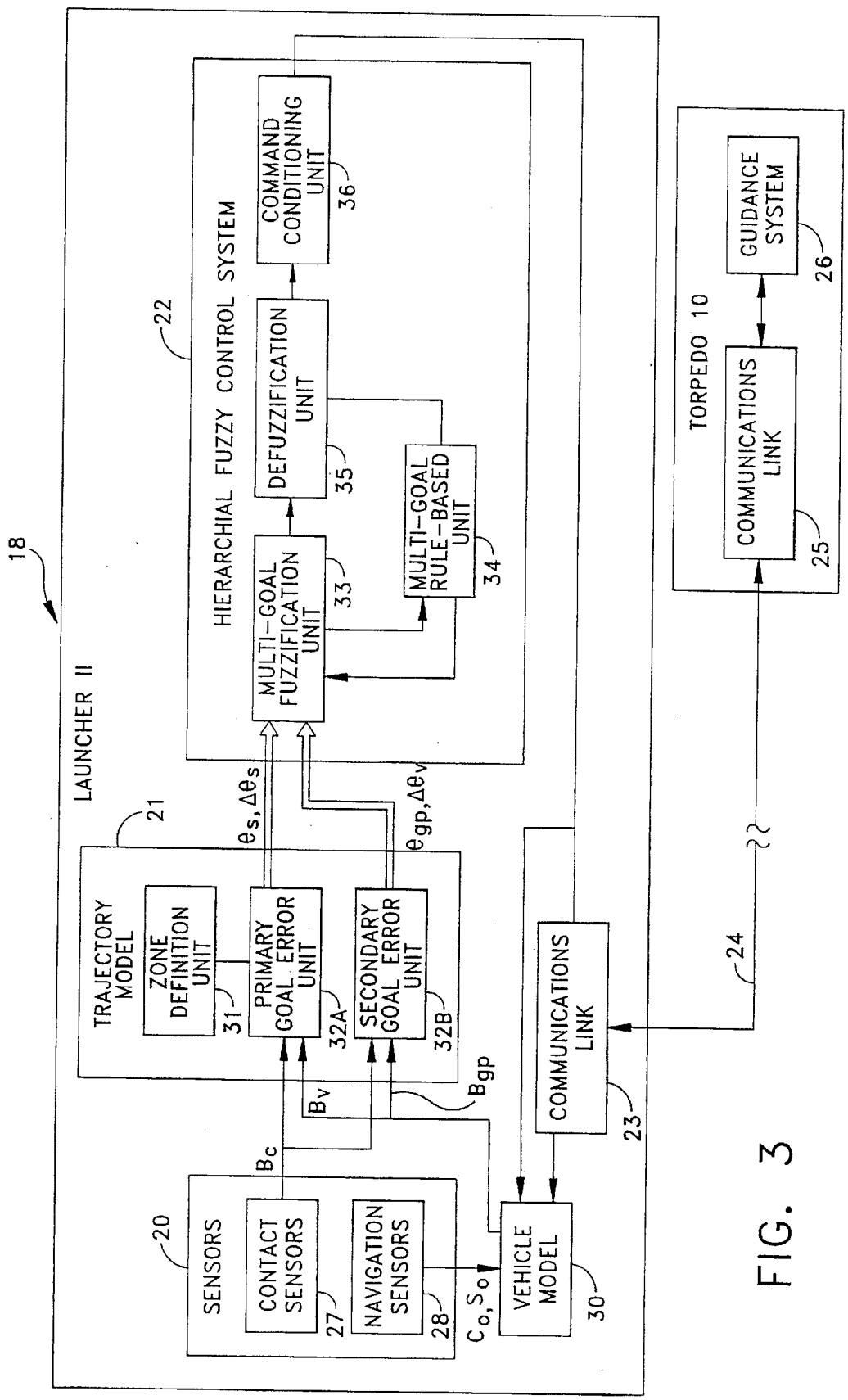
FIG. 3 is a block diagram of a guidance system constructed and operated in accordance with this invention.

As previously indicated, it is possible that the torpedo 10 will, during transit from the launcher 11 to the target 12, approach the bearing line $B_c$ and contaminate the measurements of the sensed bearing to the target 12 from the launcher 11. To avoid this situation, the control system defines a "forbidden zone" 16 around each bearing line. In FIG. 2 dashed lines 17 define the boundaries of one such zone. In this particular application, the control system steers the torpedo 10 so that it does not enter this forbidden zone 16. The details of this process are described later. It will become apparent, however, that this forbidden zone 16 is an example of a concept under which control in one zone will differ from control in another zone and under which the zones can be located at any arbitrary position and which may, in certain circumstances, yield conflicting or competing control operations or goals. For example, one goal of the system in FIG. 3 is to keep the torpedo's guidance point on the bearing line. However, that goal conflicts with the goal of keeping the torpedo 10 outside the forbidden zone 16 in FIG. 2. The conflict exists because the commands to the torpedo in this situation will direct the torpedo to steer away from the bearing line.

Referring now to FIG. 3, a guidance system 18 constructed in accordance with this invention includes sensors 20 that measure various parameters associated with the target 12 and the launcher 11. A trajectory model 21 processes data from the sensors 20 and generates a set of error functions for a hierarchical fuzzy control system 22 that classifies each of the error functions (as a plurality of sensed variables) based on competing goals into one or more goal sensed linguistic variables from corresponding sets of predetermined goal sensed linguistic variables based upon their associated goal sensed variable membership functions. This hierarchical control system 22 logically combines the goal selected sensed linguistic variables for identifying one or more control output linguistic variables and corresponding control output membership functions from a control output membership function set. The control system 22 also converts the selected control output membership function or functions into a guidance command. A communications link 23 transfers the guidance command over a bidirectional communications channel 24, typically formed by a wire connected to the torpedo 10, to another communications link 25 and a guidance system 26 in the torpedo 10.

Figure 4A:
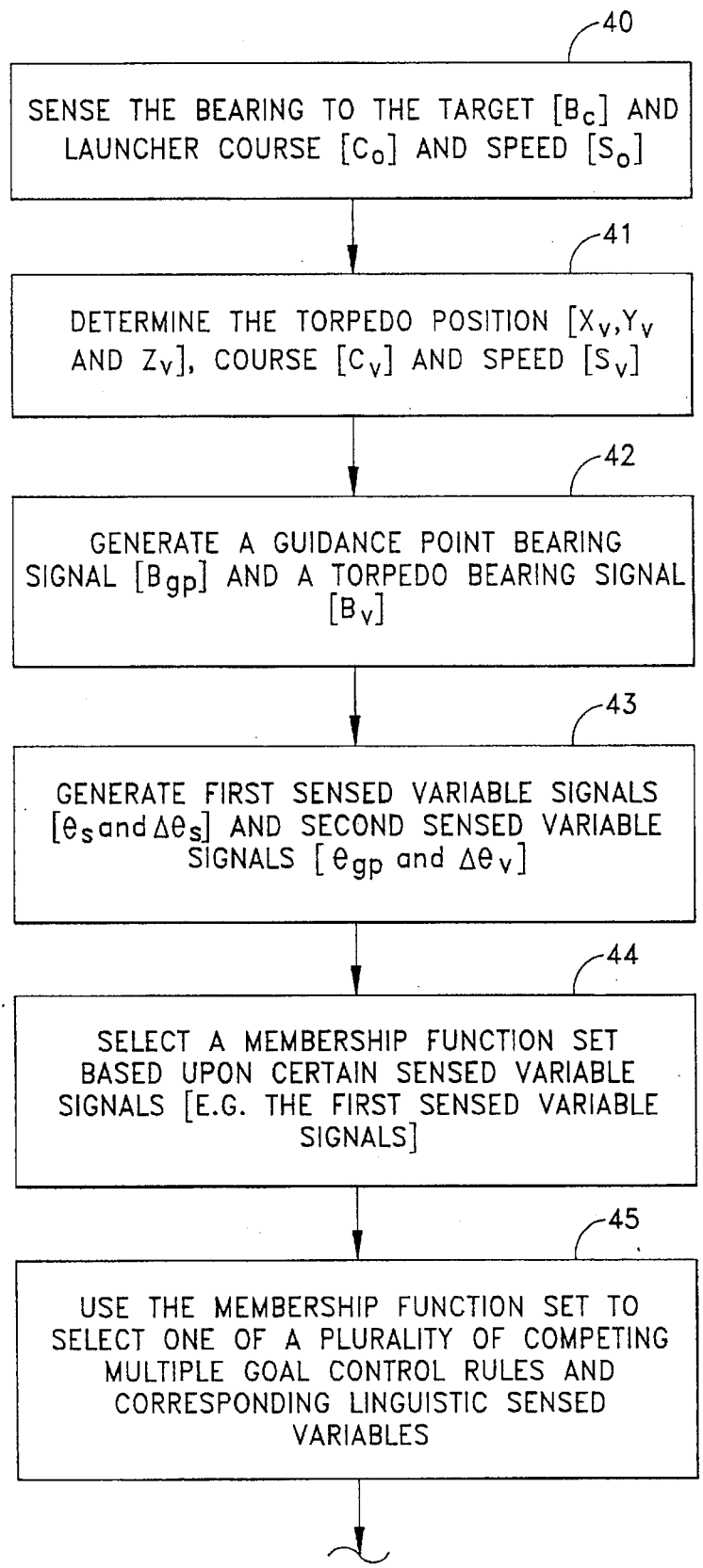
FIGS. 4A and 4B constitute a flow diagram that depicts the operation of the guidance system in FIG. 3.

Referring to FIGS. 1 and 3, the sensors 20 include contact sensors 27 that produce a bearing $B_C$ defined by the angle between the reference 13 and a line 12A to the target 12. As shown in FIG. 4A, this activity occurs during step 40. Navigation sensors 28 of FIG. 3 simultaneously produce the course $C_j$ and speed $S_O$ of the launcher 11. In step 41 (FIG. 4A) a vehicle model 30 (FIG. 3) provides the position ($X_V$, $Y_V$ and $Z_V$), course ($C_V$) and speed ($S_V$) of the torpedo 10. This information can be obtained utilizing information supplied by the navigation sensors 28 and open loop or dead reckoning updates to the vehicle model 30 or supplemented with information from the torpedo 10. The vehicle model 30 also receives information from the torpedo 10 through the communications link 24.

Whatever the inputs, the vehicle model 30 produces two signals for a primary goal error unit 32A and a secondary goal error unit 32B. One is a $B_V$ signal that represents the bearing relationship defined by the angle between the reference line 13 in FIG. 1 and a line 14A from the launcher 11 to the center point 14 of the torpedo 10. The second is a $B_{gp}$ signal that represents the bearing defined by the angle between the reference line 13 and a line 15A from the launcher 11 to the guidance point 15 of the torpedo 10. This occurs during step 42 in FIG. 4A.

In accordance with the objects of this invention, it will also be assumed that the hierarchical control system is to operate in accordance with one set of rules when the torpedo 10 lies within a forbidden zone 16 and in accordance with another set of rules when the torpedo 10 lies outside the forbidden zone 16. A primary goal error unit 32A and a zone definition unit 31 produce $e_s$ and $\Delta e_s$ sensed variable signals that, in this particular embodiment, represent, respectively, (a) the angular measure of the amount that the torpedo 10 is inside or outside the forbidden zone 16 and (b) the rate of change of that angular measure. A secondary goal error unit 32B produces $e_{gp}$ and $\Delta e_v$ sensed variable signals that, in this particular embodiment, represent, respectively, (a) instantaneous deviation between the target bearing $B_C$ and the guidance point bearing $B_{gp}$ and (b) the rate of change of the deviation between the target bearing $B_C$ and the vehicle bearing.

More specifically, during step 43 of each iteration of FIG. 4A the error units 32A and 32B in FIG. 3 convert the incoming signals into error signals representing primary and secondary sensed variables as follows:

$$e_s = |B_v - B_c| - \Theta_s \quad (1)$$

$$\Delta e_s = |e_s|_k - |e_s|_{k-1} \quad (2)$$

$$e_{gp} = B_{gp} - B_c \quad (3)$$

and $$\Delta e_v = |B_v - B_c|_k - |B_v - B_c|_{k-1} \quad (4)$$

where $$-90° \leq B_c \leq 90° \quad (5)$$

$$-90° \leq B_v \leq 90° \quad (6)$$

and wherein $\Theta_s$ is the angular measure with respect to whether the torpedo 10 is inside or outside the forbidden zone 16 in FIG. 2 and in this particular embodiment the zone definition unit 31 in FIG. 3 defines that value according to:

$$\Theta_s = \Theta_m e^{-r/c} \quad (7)$$

where "$\Theta_m$", as shown in FIG. 2, represent a maximum angular separation, generally proximate the launcher 11, "r" represents the range from the launcher 11 to the torpedo 10 and "c" is a constant. It will be apparent that this constitutes but one example of a procedure for defining whether a steerable object, such as a torpedo, is inside or outside a predetermined zone. Other zones can be defined that are in reference to the bearing line or any other relative positions of the torpedo 10, launcher 11 and target 12 or even with respect to an arbitrarily fixed location, such as a predetermined geographical area.

Step 44 in FIG. 4A represent a procedure by which the hierarchical control system 22 of FIG. 3 based on first sensed variable signals selects goal sensed variable membership functions from corresponding goal sensed variable membership function sets. In step 45, a multi-goal rule based unit 34 monitors the membership functions that the fuzzification circuit 33 generates in response to the first set of sensed variable signals from the primary goal error unit 32A. If those signals indicate that the guidance must proceed according to the primary goal (i.e., to steer the vehicle away from the forbidden zone), the rule based unit 34 transfers corresponding linguistic sensed variables to the defuzzification unit 35. If those first sensed variable signals indicate that guidance should proceed according to the secondary goal (i.e., to steer the vehicle toward the target), the rule based unit returns to the fuzzification unit 33 and selects the membership functions set corresponding to the sensed variable signals from the secondary goal error unit 32B.

Figure 5A:
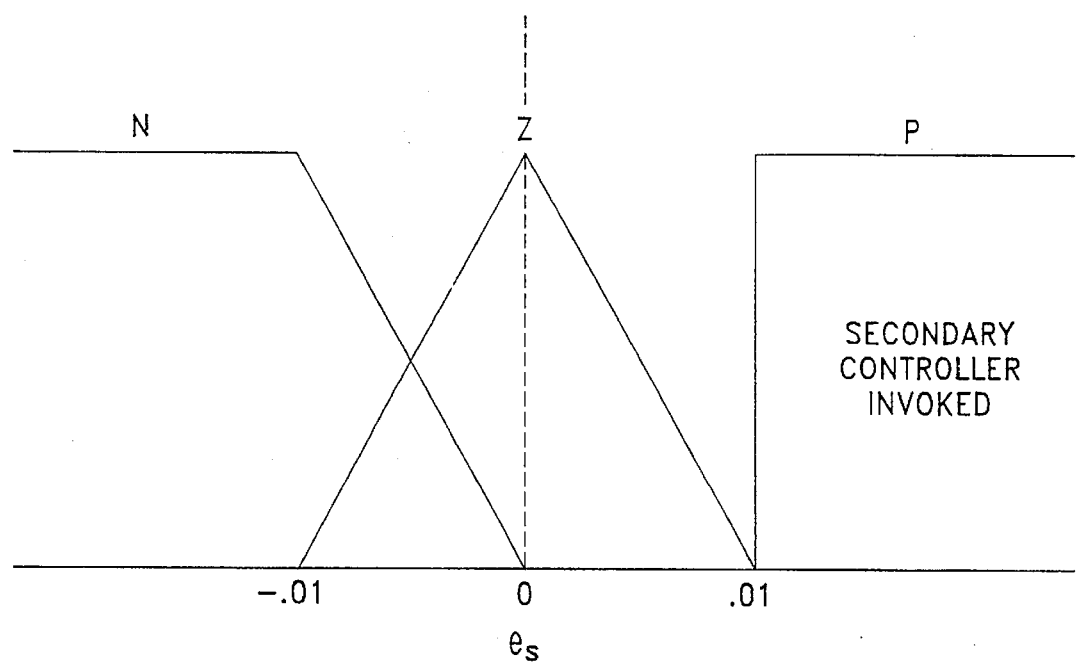
FIGS. 5A, 5B, 5C, 5D and 5E are graphical representations of linguistic variables and their associated membership function sets that are useful in understanding this invention.
Figure 5B:
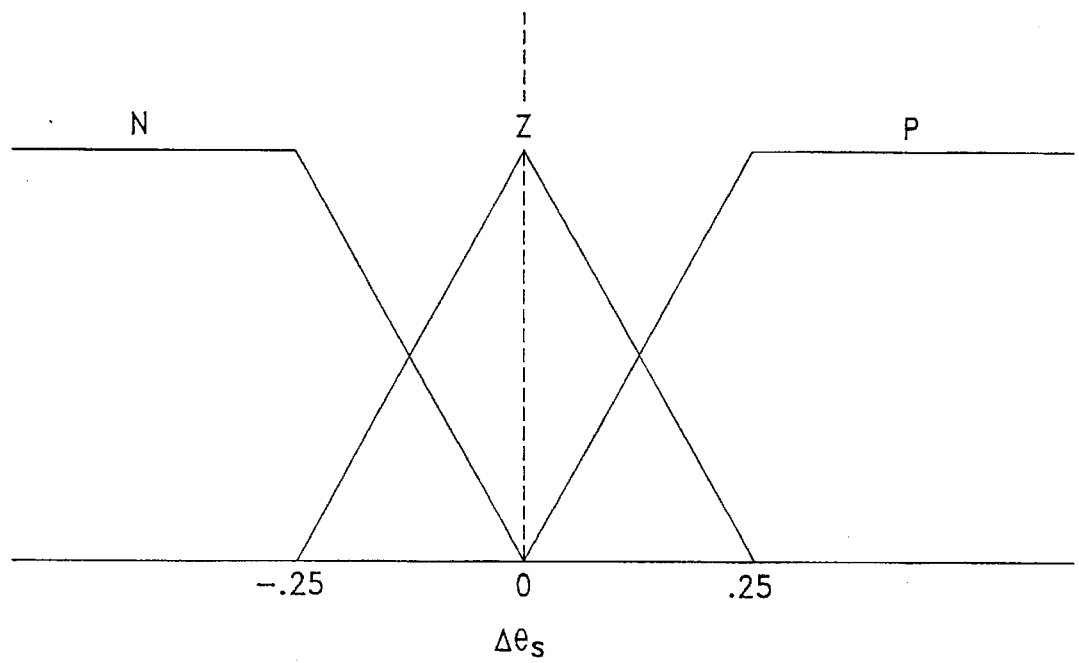
Figure 5C:
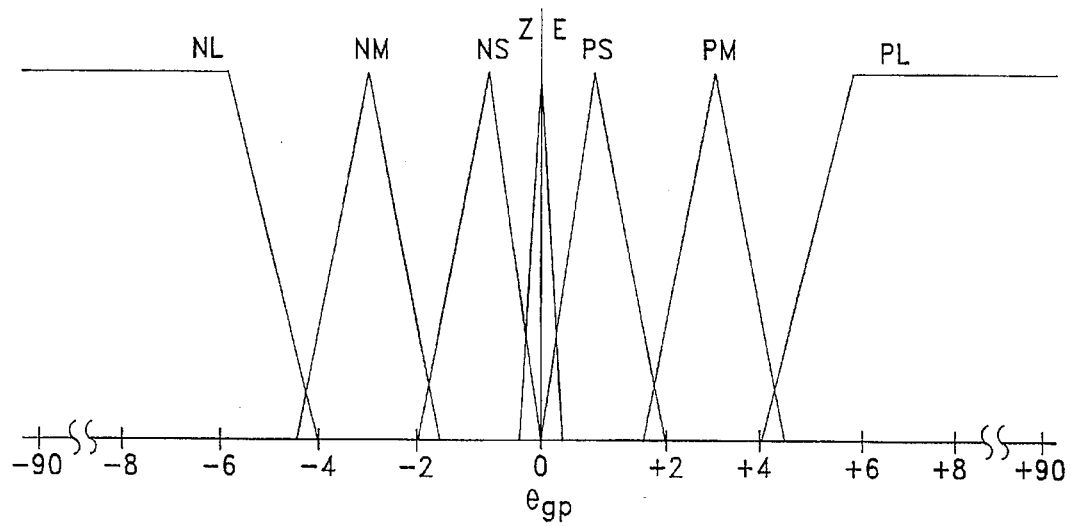

FIG. 5A, for example, discloses an $e_s$ sensed variable membership function set with three sensed variable membership functions and their corresponding sensed $e_s$, or "angular measure" linguistic variables while FIG. 5B discloses three $\Delta e_s$ sensed variable membership functions and their corresponding sensed $\Delta e_s$, or "angular measure rate of change" linguistic variables. FIG. 5C discloses an $e_{gp}$ sensed variable membership function set with seven sensed variable membership functions and their corresponding sensed $e_{gp}$, or "bearing error" linguistic variables while FIG. 5D discloses an $\Delta e_v$ sensed variable membership function set with five $\Delta e_v$ sensed variable membership functions and their corresponding sensed $\Delta e_v$, or "error rate" linguistic variables.

In the following discussion the primary goal error unit 32A in FIG. 3 and the secondary goal error unit 32B produce the foregoing $e_s$ and $\Delta e_s$ signals as primary error signals, or first sets of sensed variable signals and the $e_{gp}$ and $\Delta e_v$ signals as secondary error signals, or second sets of sensed variable signals. It will be assumed that the following relationships exist:

$$x1 = e_{gp} \quad (8)$$

$$x2 = \Delta e_v \quad (9)$$

$$x3 = e_s \quad (10)$$

and $$x4 = \Delta e_s \quad (11)$$

and that a multi-goal fuzzification unit 33 in FIG. 3 uses the $e_s$ and $\Delta e_3$ signals to select one or more of the three available angular measure ($e_s$) and angular measure rate of change ($\Delta e_s$) sensed linguistic variables or uses the $e_{gp}$ signals to select one or more of the seven available $e_{gp}$ sensed bearing error linguistic variables and the $\Delta e_v$ signal to select one or more of five available sensed error rate linguistic variables.

The possibilities in this particular embodiment, that includes secondary goal "bearing error" and "error rate" linguistic variables $T_{x1}$ and $T_{x2}$ respectively and the primary goal "angular measure" and "angular measure rate of change" linguistic variables $T_{x3}$ and $T_{x4}$, respectively can be designated as:

$$T(x1) = (T_{x1}^1, T_{x1}^2, T_{x1}^3, T_{x1}^4, T_{x1}^5, Y_{x1}^6, T_{x1}^7) \quad (12)$$
$$= (NL, NM, NS, ZE, PS, PM, PL)$$

$$T(x2) = (T_{x2}^1, T_{x2}^2, T_{x2}^3, T_{x2}^4, T_{x2}^5) \quad (13)$$
$$= (NL, NS, ZE, PS, PL)$$

$$T(x3) = (T_{x3}^1, T_{x3}^2, T_{x3}^3) \quad (14)$$
$$= (N, ZE, P)$$

and $$T(x4) = (T_{x4}^1, T_{x4}^2, T_{x4}^3) \quad (15)$$
$$= (N, ZE, P)$$

where "NL", "NS", "NM", "ZE", "PS", "PM", and "PL" denote Negative Large, Negative Small, Negative Medium, Zero, Positive Small, Positive Medium, and Positive Large sensed linguistic variables, respectively. "N", "Z" and "P" denote Positive, Zero and Negative sensed linguistic variables associated with the primary goal error unit 32A.

The specific set of membership functions μ(x1) and μ(x2) corresponding to inputs x1 and x2 and the sensed bearing error and error rate linguistic variables associated with the secondary goal and shown in FIGS. 5C and 5D, can be mathematically stated as follows:

$$\mu(x1) = (\mu_{x1}^1, \mu_{x1}^2, \mu_{x1}^3, \mu_{x1}^4, \mu_{x1}^5, \mu_{x1}^6, \mu_{x1}^7) \quad (16)$$

and $$\mu(x2) = (\mu_{x2}^1, \mu_{x2}^2, \mu_{x2}^3, \mu_{x2}^4, \mu_{x2}^5). \quad (17)$$

For j=1 and i=2,3,4,5,6 and for j=2 and i=2,3,4

$$\mu_{xj}^i = -\frac{(|xj - C_{xj}^i|)}{\delta_{xj}^i} + 1 \quad (18)$$

for $$C_{xj}^i - \delta_{xj}^i \leq xj \leq C_{xj}^i + \delta_{xj}^i \quad (19)$$

and $$\mu_{xj}^i = 0 \quad (20)$$

for $$C_{xj}^i - \delta_{xj}^i > xj > C_{xj}^i + \delta_{xj}^i \quad (21)$$

The end conditions, j=1 and i=1,7 and j=2 and i=1,5 are defined by the following equations:

$$\mu_{xj}^i = -\frac{(|xj - C_{xj}^i|)}{\delta_{xj}^i} + 1 \quad (22)$$

for $$a^i C_{xj}^i \geq a^i xj \geq a^i(C_{xj}^i - a^{\delta i}_{xj}) \quad (23)$$

and $$\mu_{xj}^i = 1 \quad (24)$$

for $$a^i C_{xj}^i < a^i xj \quad (25)$$

and $$\mu_{xj}^i = 0 \quad (26)$$

for $$a^i(C_{xj}^i - a^{\delta i}_{xj}) > a^i xj \quad (27)$$

where $a^i = 1$, except for i=1 where $a^1 = -1$.

The specific set of membership functions μ(x3) and μ(x4) corresponding to inputs x3 and x4 and the angular measure and angular measure rate of change linguistic variables associated with the primary goal and shown in FIGS. 5A and 5B, can be mathematically stated as follows:

$$\mu(x3) = (\mu_{x3}^1, \mu_{x3}^2, \mu_{x3}^3) \quad (28)$$

and $$\mu(x4) = (\mu_{x4}^1, \mu_{x4}^2, \mu_{x4}^3). \quad (29)$$

For j=3 and i=2 and for j=4 and i=2

$$\mu_{xj}^i = -\frac{(|xj - C_{xj}^i|)}{\delta_{xj}^i} + 1 \quad (30)$$

for $$C_{xj}^i - \delta_{xj}^i \leq xj \leq C_{xj}^i + \delta_{xj}^i \quad (31)$$

and $$\mu_{xj}^i = 0 \quad (32)$$

for $$C_{xj}^i - \delta_{xj}^i > xj > C_{xj}^i + \delta_{xj}^i \quad (33)$$

For j=3 and i=1 and for j=4 and i=1,3:

$$\mu_{xj}^i = -\frac{(|xj - C_{xj}^i|)}{\delta_{xj}^i} + 1 \quad (34)$$

for $$a^i C_{xj}^i \geq a^i xj \geq a^i(C_{xj}^i - a^{\delta i}_{xj}) \quad (35)$$

and $$\mu_{xj}^i = 1 \quad (36)$$

for $$a^i C_{xj}^i < a^i xj \quad (37)$$

and $$\mu_{xj}^i = 0 \quad (38)$$

for $$a^i(C_{xj}^i - a^{\delta i}_{xj}) > a^i xj \quad (39)$$

where $a^i = 1$, except for i=1 where $a^1 = -1$.

For j=3 and i=3.

$$\mu_{xj}^i = 1 \quad (40)$$

for $$C_{xj}^i < xj \quad (41)$$

and $$\mu_{xj}^i = 0 \quad (42)$$

for $$C^i_{xj} > xj \tag{43}$$

FIG. 5A depicts graphically the relationship of each angular measure error linguistic variable and associated membership function in the $e_s$ membership function set for different values of the $e_s$ signal according to a specific set of values for $C^i_{xj}$ and $\delta^i_{xj}$. FIG. 5B presents analogous information for the $\Delta e_s$ signal. In the specific embodiment shown in FIGS. 5A and 5B certain incoming signals correspond to a single or multiple sensed angular measure error and angular measure error rate linguistic variables based upon corresponding membership functions. For example, in FIG. 5A the $e_s$ membership function set is used to encode an $e_s$ signal having a value 0 only into a Z linguistic sensed angular measure error variable whereas a value of about −0.005 is encoded into both Z and N sensed angular measure error linguistic variables by using the $e_s$ membership function set. Likewise the angular measure error rate membership set in FIG. 5B encodes a signal $\Delta e_s=0.3$ into a P sensed angular measure error rate linguistic variable and a signal $\Delta e_s=0.1$ into both Z and P sensed angular measure error rate linguistic variables.

FIG. 5C similarly depicts graphically the relationship of each sensed bearing error linguistic variable and associated membership function in the $e_{gp}$ membership function set for different values of the $e_{gp}$ signal according to another specific set of values for $C^i_{xj}$ and $\delta^i_{xj}$. FIG. 5D presents corresponding information for the $\Delta e_y$ signal. In the specific embodiment shown in FIGS. 5C and 5D certain incoming signals may also correspond to a single or multiple sensed bearing error and sensed error rate linguistic variables based upon corresponding membership functions.

Figure 4B:
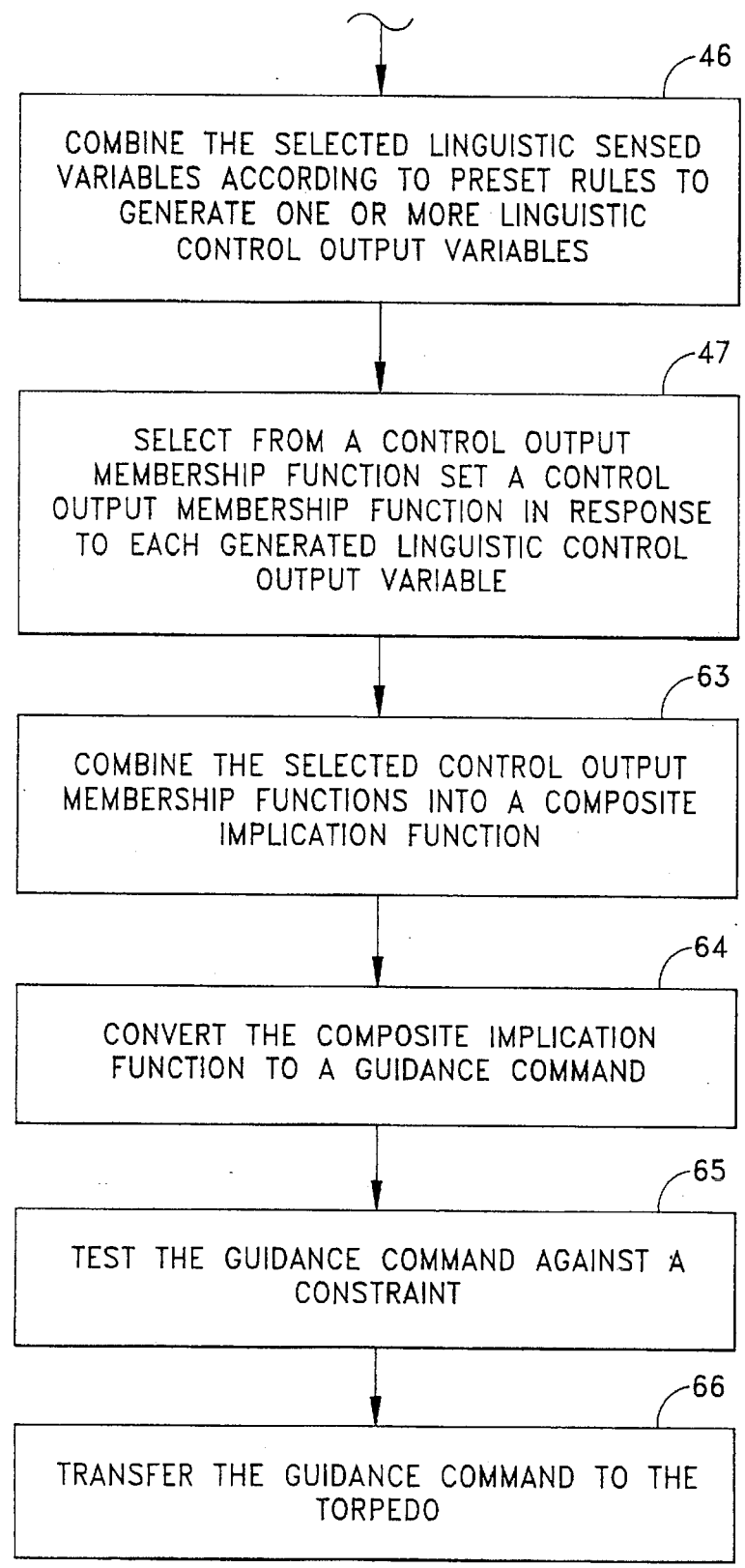
Figure 5E:
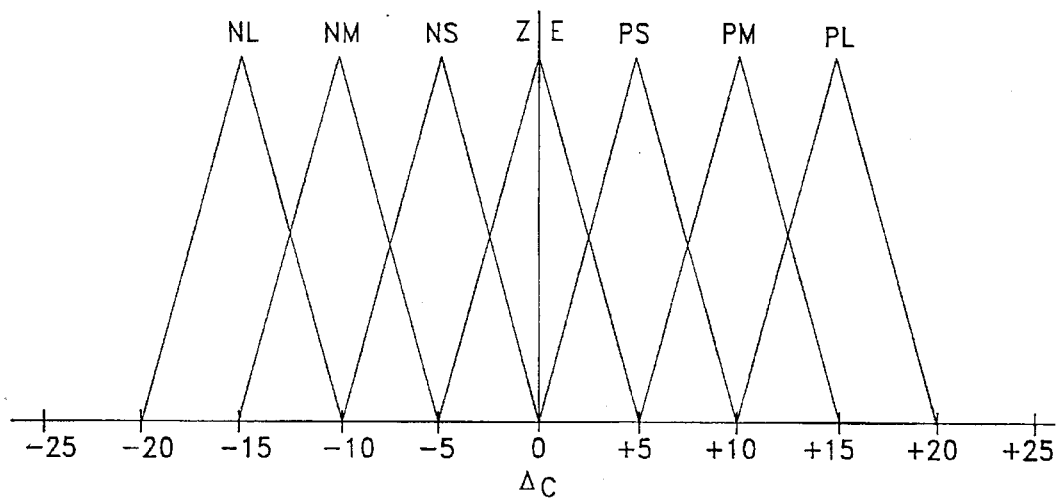
Figure 6:
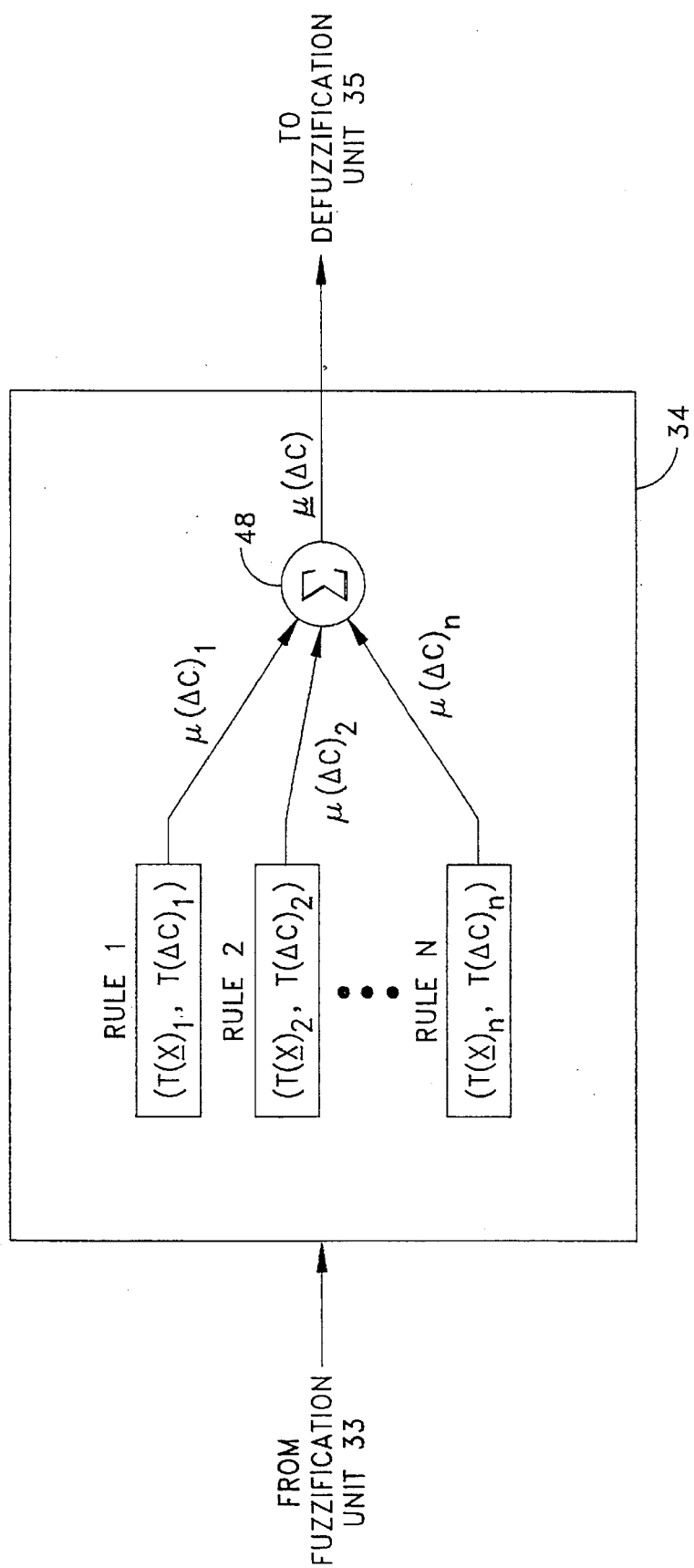
FIG. 6 schematically represents a multi-goal rule based unit shown in FIG. 3.

Referring to step 46 in FIG. 4B, the multi-goal rule based unit 34 in FIGS. 3 and 6 combines certain selected sensed linguistic variables to produce one or more control output linguistic variables in response to the hierarchical control described in steps 44 and 45 of FIG. 4A. Each selected control output linguistic variable corresponds to a predefined membership function in a control output membership function set (FIG. 5E). More specifically, each control output linguistic variable is determined according to a set of rules defined in FIGS. 7A, 7B, 7C and 7D. The control outputs include, in this specific embodiment, seven control output linguistic variables defined as:

$$T(\Delta C) = (T^1_{\Delta C}, T^2_{\Delta C}, T^3_{\Delta C}, T^4_{\Delta C}, T^5_{\Delta C}, T^6_{\Delta C}, T^7_{\Delta C}) \tag{44}$$
$$= (NL, NM, NS, ZE, PS, PM, PL).$$

The corresponding control output membership functions, $(\mu(\Delta C))$ are:

$$\mu(\Delta C)=\{\mu^1_{\Delta C}, \mu^2_{\Delta C}, \mu^3_{\Delta C}, \mu^4_{\Delta C}, \mu^5_{\Delta C}, \mu^6_{\Delta C}, \mu^7_{\Delta C}\} \tag{45}$$

and shown in FIG. 5E and can be defined mathematically for i=1,2,3,4,5,6,7 by $$\mu^i_{\Delta C} = \frac{-(|\Delta C - C^i_{\Delta C}|)}{\delta^i_{\Delta C}} + 1 \tag{46}$$

for $$C^i_{\Delta C} - \delta^i_{\Delta C} \leq \Delta C \leq C^i_{\Delta C} + \delta^i_{\Delta C} \tag{47}$$

and by $$\mu^i_{\Delta C} = 0 \tag{48}$$

for $$C^i_{\Delta C} - \delta^i_{\Delta C} > \Delta C > C^i_{\Delta C} + \delta^i_{\Delta C} \tag{49}$$

Values for the various constants $C^i$ and $\delta^i$ are associated with different membership functions of the sensed variable and control output variable membership function sets. If $\mu(x3)$ and $\mu(x4)$ represent the sensed variable membership function sets associated with the angular measure and angular measure error rate sensed variables for the primary goal membership functions, a control system constructed in accordance with this invention can operate with the following constants:

| | $\mu(x3)$ | | $\mu(x4)$ | |
|---|---|---|---|---|
| i | $C^i_{x3}$ | $\delta^i_{x3}$ | $C^i_{x4}$ | $\delta^i_{x4}$ |
| 1 | −0.01 | 0.01 | −0.25 | 0.25 |
| 2 | 0 | .01 | 0 | 0.25 |
| 3 | 0.01 | | 0.25 | 0.25 |

Similarly, if $\mu(x1)$ and $\mu(x2)$ represent the sensed variable membership function sets associated with the secondary goal error unit 32B in FIG. 3 and $\mu(\Delta C)$ represents the output control membership function set, the following constants can also be used:

| | $\mu(x1)$ | | $\mu(x2)$ | | $\mu(\Delta C)$ | |
|---|---|---|---|---|---|---|
| i | $C^i_{x1}$ | $\delta^i_{x1}$ | $C^i_{x2}$ | $\delta^i_{x2}$ | $C^i_{\Delta C}$ | $\delta^i_{\Delta C}$ |
| 1 | −5.0 | 1.0 | −0.95 | 0.45 | −15.0 | 5.0 |
| 2 | −3.0 | 1.5 | −0.3375 | 0.3375 | −10.0 | 5.0 |
| 3 | −1.0 | 1.0 | 0.0 | 0.1875 | −5.0 | 5.0 |
| 4 | 0.0 | 0.4 | 0.3375 | 0.3375 | 0.0 | 5.0 |
| 5 | 1.0 | 1.0 | 0.95 | 0.45 | 5.0 | 5.0 |
| 6 | 3.0 | 1.5 | | | 10.0 | 5.0 |
| 7 | 5.0 | 1.0 | | | 15.0 | 5.0 |

In accordance with this invention and as previously indicated, the multi-goal rule based unit 34 of FIGS. 3 and 6 operates according to a primary set of rules that are invoked whenever the torpedo 10 in FIG. 1 enters or approaches the forbidden zone 16 of FIG. 2 or according to a secondary set of rules that are invoked whenever the torpedo 10 is reasonably displaced from the forbidden zone 16. Thus as the torpedo 10 begins to move close to the forbidden zone 16, the $e_s$ signal will be positive and the multi-goal fuzzification unit will select the Z linguistic variable from the $e_s$ membership set shown in FIG. 5A and, assuming a rate of change that is greater than 0.25 and will select the P linguistic variable from the $\Delta e_s$ membership set shown in FIG. 5B. Assuming the $B_v-B_c$ is positive, the multi-goal rule based unit 34 then will use the matrix in FIG. 7A to select a ZE control output linguistic variable. So long as the torpedo is within the forbidden zone or close to the forbidden zone, as defined by a value of the $e_s$ sensed variable that is less than 0.01 in this specific embodiment, the multi-goal rule based unit 34 relies entirely on the matrices in FIGS. 7A and 7B to select the control output linguistic variables to be used in steering the torpedo 10 out of or away from the forbidden zone 16 in FIG. 2 associated with the current target bearing.

Whenever the torpedo 10 is far enough outside the forbidden zone, as represented when the $e_s$ signal has a value greater than 0.01 in this embodiment, the selection of the control output linguistic variable is based on the matrices shown in FIGS. 7C and 7D. For example, if the multi-goal fuzzification unit 33 classifies the $e_s$ signal into a P linguistic variable and classifies both the $e_{gp}$ and $\Delta e_v$ signals as Negative Large (NL) sensed linguistic variables, the multi-goal rule based unit 34 will generate a positive large (PL) control output linguistic variable. FIGS. 7A and 7C depict the control output linguistic variable membership rules in matrix form for positive values of the difference ($B_v$–$B_c$); FIGS. 7B and 7D, for negative values of the difference ($B_v$–$B_c$).

When generating a command based upon the primary goal or secondary goal criteria, the multi-goal rule based unit 34 in FIGS. 3 and 6 utilizes either the possible combinations for the given primary or secondary set of readings based on competing primary or secondary goals to produce an output based upon the selection of one or more control output membership functions. That is, the multi-goal rule based unit 34 will use the matrices of FIGS. 7A and 7B when the torpedo 10 is in or proximate the forbidden zone 16 or the matrices of FIGS. 7C and 7D when the torpedo is at any other position. More specifically, if $e_s$>0.01 and if $e_{gp}$=+0.3 and $\Delta e_v$=0.15, the $e_{gp}$ signals can be classified both as ZE and PS sensed bearing error linguistic variables based upon the x1 or $e_{gp}$ membership function set of FIG. 5C while the $\Delta e_v$ signal is encoded into ZE and PS sensed error rate linguistic variables based upon the x2 or $\Delta e$ membership function set of FIG. 5D.

A summing circuit 48, symbolically referenced in FIG. 6, essentially combines each of the output variable membership functions corresponding to each of the selected control output linguistic variables to produce an output signal as shown by steps 47 and 63 in FIG. 4B. More specifically, the summing circuit 48 in FIG. 6 combines the selected control output membership functions scaled by the various sensed variable signals as illustrated in FIGS. 8 and 9.

FIG. 8 depicts the operation that occurs when the primary goal error unit 32A generates angular measure and angular measure error rate signals of $e_s$=–0.005 and $\Delta e_s$=–0.2 indicating that the torpedo is within the forbidden zone 16. During the selection of the corresponding sensed linguistic variables, the multi-goal fuzzification unit 33 correlates each of the $e_s$ and $\Delta e_s$ sensed variables into a particular point on any corresponding encoding sensed variable membership function as shown by Graphs 8A through 8D. In this particular embodiment, for example, the $e_s$ signal intersects both the Z and N membership functions shown in FIG. 5A and the $\Delta e_s$ signal intersects the Z and N membership functions shown in FIG. 5B. The multi-goal rule based unit 34 then selects one output control linguistic variable for each possible logical combination of the sensed variable linguistic variables. In this particular example, each signal corresponds to two membership functions, so the multi-goal rule based unit 34 executes four rules and selects four control output linguistic variables. The summing unit scales each selected control output membership function through the selection of the lower of the intercepts of the input signals with the corresponding sensed variable membership functions incorporated in a specific rule.

Using FIG. 8 as an example and assuming that the torpedo is inside the forbidden zone and that $B_v$–$B_c$<0, the multi-goal rule based unit 34 operates according to the matrix in FIG. 7B. In Graph 8A the $e_s$ and $\Delta e_s$ signals are shown as intersecting the Z linguistic variables for each so the multi-goal rule based unit 34 selects the ZE control output linguistic variable according to the rule:

IF $e_s$ is Z and $\Delta e_s$ is Z THEN AC is ZE

Graphs 8B through 8D define the other three rules that the multi-goal rule based unit 34 invokes under the remaining three logical combinations as follows:

IF $e_s$ is Z and $\Delta e_s$ is N THEN AC is NS
IF $e_s$ is N and $\Delta e_s$ is Z THEN AC is NM
IF $e_s$ is N and $\Delta e_s$ is N THEN AC is NS Graphs 8A through 8D also depict graphically one approach for combining the selected control output linguistic variables for producing a command signal. In Graph 8A, an intersection 47A of the $\Delta e_s$ signal with its Z membership function is lower than an intersection 50A of the $e_s$ signal with its selected Z membership function, so the $\Delta e_s$ signal controls the magnitude of the selected ZE control output membership function by establishing a scaled triangular output function 51A with its peak at intersection 52A rather than the intersection 53A. In a similar fashion, the second rule depicted in Graph 8B produces a triangular form 54A based upon an intersection 55A of the $e_s$ signal with the Z sensed variable membership function that is lower than an intersection 56A of the $\Delta e_s$ signal with its corresponding N membership function. Similarly the rules depicted in Graphs 8C and 8D provide triangular forms 57A and 58A respectively based upon a lower intersection 60A of the $\Delta e_s$ signal in FIG. 8C and upon a lower intersection 61A of the $e_s$ signal in FIG. 8D.

Figure 5D:
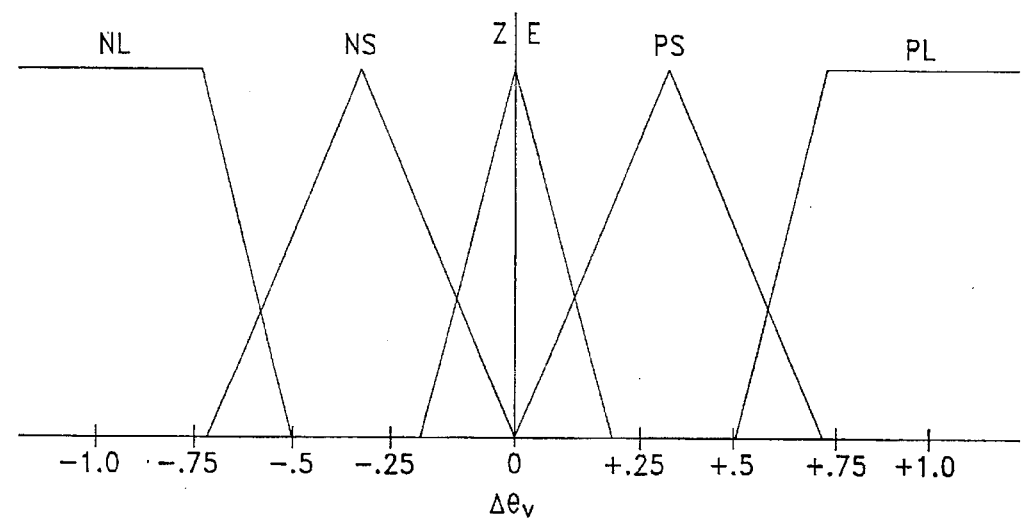

Whenever the $e_s$ primary goal error unit produces a sensed variable signal that identifies the P linguistic variable indicating that the torpedo 10 is outside the forbidden zone 16, the multi-goal rule based unit 34 operates in response to the $e_{gp}$ and $\Delta e_v$ sensed variable signals according to the membership functions shown in FIGS. 5C and 5D and the matrices shown in FIGS. 7C and 7D. FIG. 9 graphically depicts the formation of the composite control output function under these operating conditions for each of four input combinations and correlations as shown in Graphs 9A through 9D respectively.

Assuming that $e_s$ is P and ($B_v$–$B_c$)>0, FIG. 7C discloses that the multi-goal rule based unit 34 correlates each of the possible four input combinations for the secondary goal as follows:

IF $e_{gp}$ is ZE AND $\Delta e_v$ is ZE THEN AC is ZE.
IF $e_{gp}$ is ZE AND $\Delta e_v$ is PS THEN AC is NS.
IF $e_{gp}$ is PS AND $\Delta e_v$ is ZE THEN AC is NS.
IF $e_{gp}$ is PS AND $\Delta e_v$ is PS THEN AC is NM.

Thus in step 46 the multi-goal rule based unit 34 produces different output consequences or control output linguistic variables derived from these selected rules.

In the case of the first rule shown in Graph 9A, an intersection 47B of the $\Delta e_v$ signal with ZE membership function is lower than the intersection 50B of the $e_{gp}$ signal with its selected ZE membership function, so the $\Delta e_v$ signal controls the magnitude of the selected ZE control output membership function by establishing a scaled triangular output function 51B with its peak at intersection 52B rather than the intersection 53B. In a similar fashion, the multi-goal rule based unit 34 produces triangular forms 54B, 57B and 58B respectively.

Stated mathematically, multi-goal rule based unit 34 produces outputs for up to a maximum of four inferred control output functions from each of the identified rules. For example, these functions, for the set resulting from the operation of the secondary error unit 32B are, respectively, (1) $\zeta_{(1)}\mu^4{}_{AC}$, (2) $\zeta_{(2)}\mu^3{}_{AC}$, (3) $\zeta_{(3)}\mu^3{}_{AC}$ and (4) $\zeta_{(4)}\mu^2{}_{AC}$ where:

$\zeta_{(1)}\mu^4{}_{AC}$=$\mu(\Delta C)_{(1)}$=the control output function for rule 1 defined by $\mu^4{}_{AC}$ multiplied by the value $\zeta_{(1)}$; and $\zeta_{(2)}\mu^3{}_{AC}$=$\mu(\Delta C)_{(2)}$=the control output function for rule 2 defined by $\mu^3{}_{AC}$ multiplied by the value $\zeta_{(2)}$.

$\zeta_{(3)}\mu^3{}_{AC}$=$\mu(\Delta C)_{(3)}$=the control output function for rule 3 defined by $\mu^3{}_{AC}$ multiplied by the value $\zeta_{(3)}$; and $\zeta_{(4)}\mu^2{}_{\Delta C}=\mu(\Delta C)_{(4)}$=the control output function for rule 4 defined by $\mu^2{}_{\Delta C}$ multiplied by the value $\zeta_{(4)}$; and $$\zeta_{(1)}=Y_{x1}{}^4 \wedge Y_{x2}{}^3=\min\ (Y_{x1}{}^4,\ Y_{x2}{}^3) \quad (50)$$

$$\zeta_{(2)}=Y_{x1}{}^4 \wedge Y_{x2}{}^4=\min\ (Y_{x1}{}^4,\ Y_{x2}{}^4) \quad (51)$$

$$\zeta_{(3)}=Y_{x1}{}^5 \wedge Y_{x2}{}^3=\min\ (Y_{x1}{}^5,\ Y_{x2}{}^3) \quad (52)$$

$$\zeta_{(4)}=Y_{x1}{}^5 \wedge Y_{x2}{}^4=\min\ (Y_{x1}{}^5,\ Y_{x2}{}^4) \quad (53)$$

where $Y_{xj}{}^i$ is $\mu_{xj}{}^i$ evaluated at a specific sensed input xj(t) at time "t" and where "$\wedge$" denotes a fuzzy minimum. The control output composite implication function, $\mu(\Delta C)$, of the multi-goal rule based unit 34 for this example is expressed as:

$$\mu(\Delta C)=\mu(\Delta C)_{(1)}+\mu(\Delta C)_{(2)}+\mu(\Delta C)_{(3)}+\mu(\Delta C)_{(4)} \quad (54)$$

The inferred control output functions are generated in a similar fashion for the primary error unit example.

As previously indicated, the ruled based unit 34 in FIGS. 3 and 6 also operates in accordance with step 63 of FIG. 4B by combining the scaled fuzzy output membership functions shown in FIG. 8 or FIG. 9 into a composite output function. A number of methods can be utilized for converting composite outputs into guidance commands in step 64. The defuzzification unit 35 for example, can use a centroid method to provide guidance commands. Mathematically the centroid is computed as follows:

$$\Delta C = \frac{\Sigma_k[(\zeta_{(k)}C_{\Delta C_{(k)}}I_{\Delta C_{(k)}}]}{\Sigma_k \zeta_{(k)} I_{\Delta C_{(k)}}} \quad (55)$$

where $\Sigma_{(k)}$ is the summation over all the rules selected by the multi-goal rule based unit 34 and $I_{\Delta C(k)}$ and $C_{\Delta C(k)}$ are the respective area and centroid of the kth rule consequent set membership function. This is represented in Graphs 8E and 9E that depict the superposition of the scaled control output membership functions of Graphs 8A through 8D and Graphs 9A through 9D, respectively. The resulting composite output function for either of the selected goals is the sum of the selected individual control output functions. With reference to Graph 8E, this composite function includes the area under the dashed line 59A plus the sides 57A' and 51A' of the functions 57A and 51A, respectively. Similarly, the composite function shown in Graph 9E includes the area under the dashed line 59B plus the sides 58B' and 51B' of the functions 58B and 51B, respectively. The defuzzification unit 35 calculates the centroid for either of the functions of Graphs 8E or 9E to produce a resulting $\Delta C$ signal that is the finite signal for controlling the torpedo 10 in FIG. 1.

Figure 10:
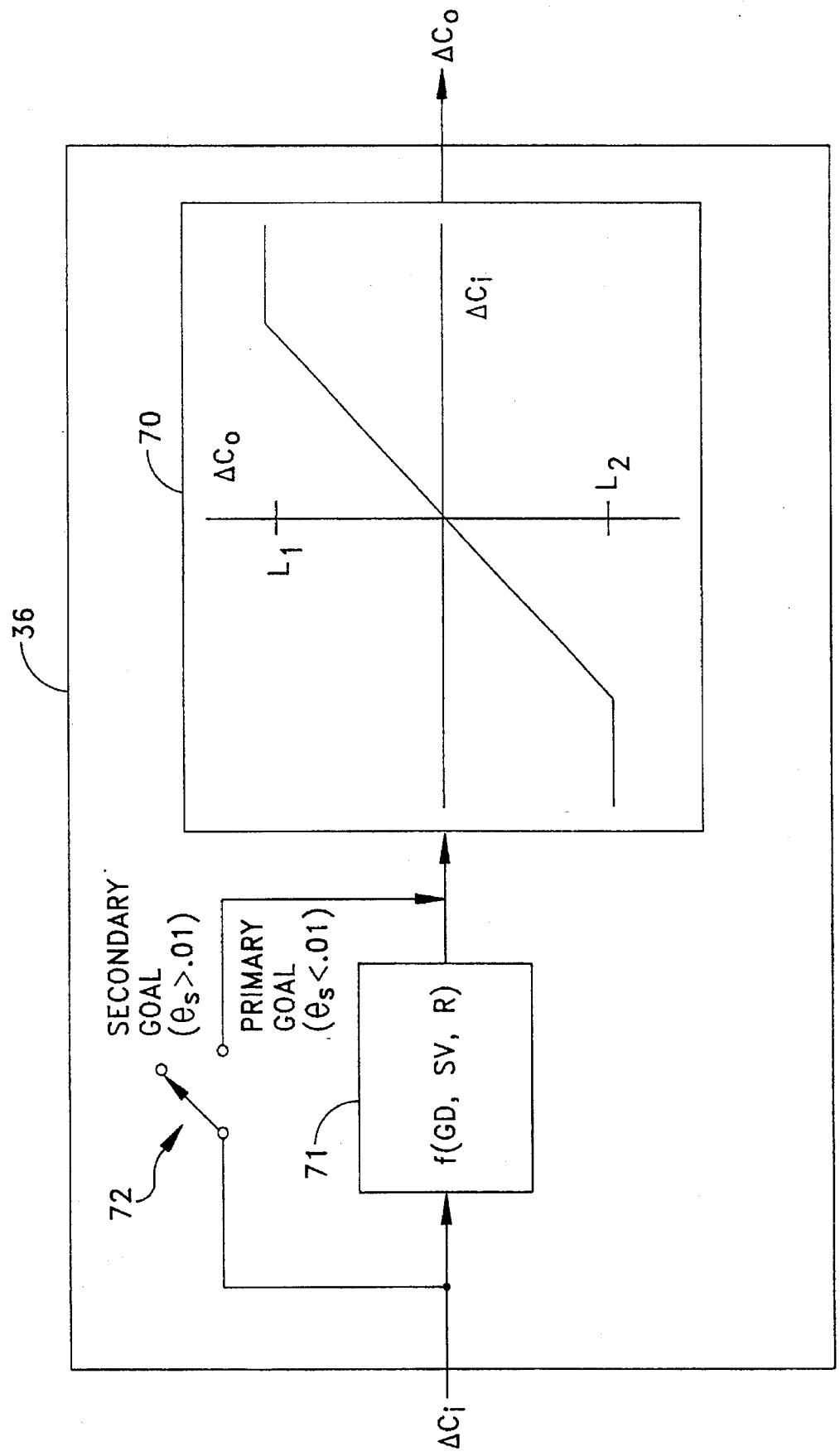
FIG. 10 graphically represents the operation of a command conditioning unit shown in FIG. 3.

In some situations, particularly where the launcher 11 and target 12 undergo independent motion, it may be desirable to condition these control actions. For example, it is desirable to assure that the torpedo is not moved into a position whereby it has a searching velocity vector component directed back to the launcher 11. The command conditioning unit 36 in FIG. 3 tests the guidance command against various limits as indicated in step 65 in FIG. 4B. A command limit unit 70 in FIG. 10 interrogates each control command $\Delta C_i$ from the defuzzification unit 35 to determine if this command will cause the torpedo 10 to exceed any limits that are governed by a particular circumstance. FIG. 10 graphically represents one set of limits "$L_1$" and "$L_2$". In terms of the specifically disclosed embodiment described above, these limits can be defined mathematically, assuming there is no initial vehicle velocity component toward the launcher, as follows:

$$L_1=B_v+90°-(C_{vm})_{k-1} \quad (56)$$

and $$L_2=B_v-90°-(C_{vm})_{k-1} \quad (57)$$

where $(C_{vm})_{k-1}$ is the vehicle course from the last update cycle.

If the limit is defined as shown in FIG. 10 and is exceeded, only that portion of the command that produces a course perpendicular to the torpedo bearing line between the launcher 11 and torpedo 10 in FIG. 1 will be utilized. In the specific application of a torpedo launched from a submarine, these limits ensure that the trajectory of the torpedo from the addition of various system commands does not produce a velocity component toward the launcher 11 in its then current position.

A secondary goal conditioning unit 71 in FIG. 10 may be included to perform further command conditioning necessary for good control with different tactical parameters only when the torpedo 10 is outside the forbidden zone 16. A switch 72 represents a bypass that is open during such operating conditions. One such modification could be a modification of the command as a function of the vehicle guidance distance (GD), the range (R) from the launching vehicle 11 to the torpedo 10 and the speed (SV) of the torpedo 10. The vehicle guidance distance is the distance along the torpedo axis between the guidance point and the center of mass for the torpedo. For example, a modification could be provided according to:

$$K=f(GD,SV,R)=K_0(SV)R/GD \quad (58)$$

where $K_0$ is gain constant.

After the control system 22 generates its command signal subject to the command conditioning unit 36, the communications link 23 transfers the command signal over the communications channel 24 to the communications link 25 in step 66 of FIG. 4B. The guidance system 26 responds to any command requiring a course alteration by changing the path of the torpedo 10.

Figure 11A:
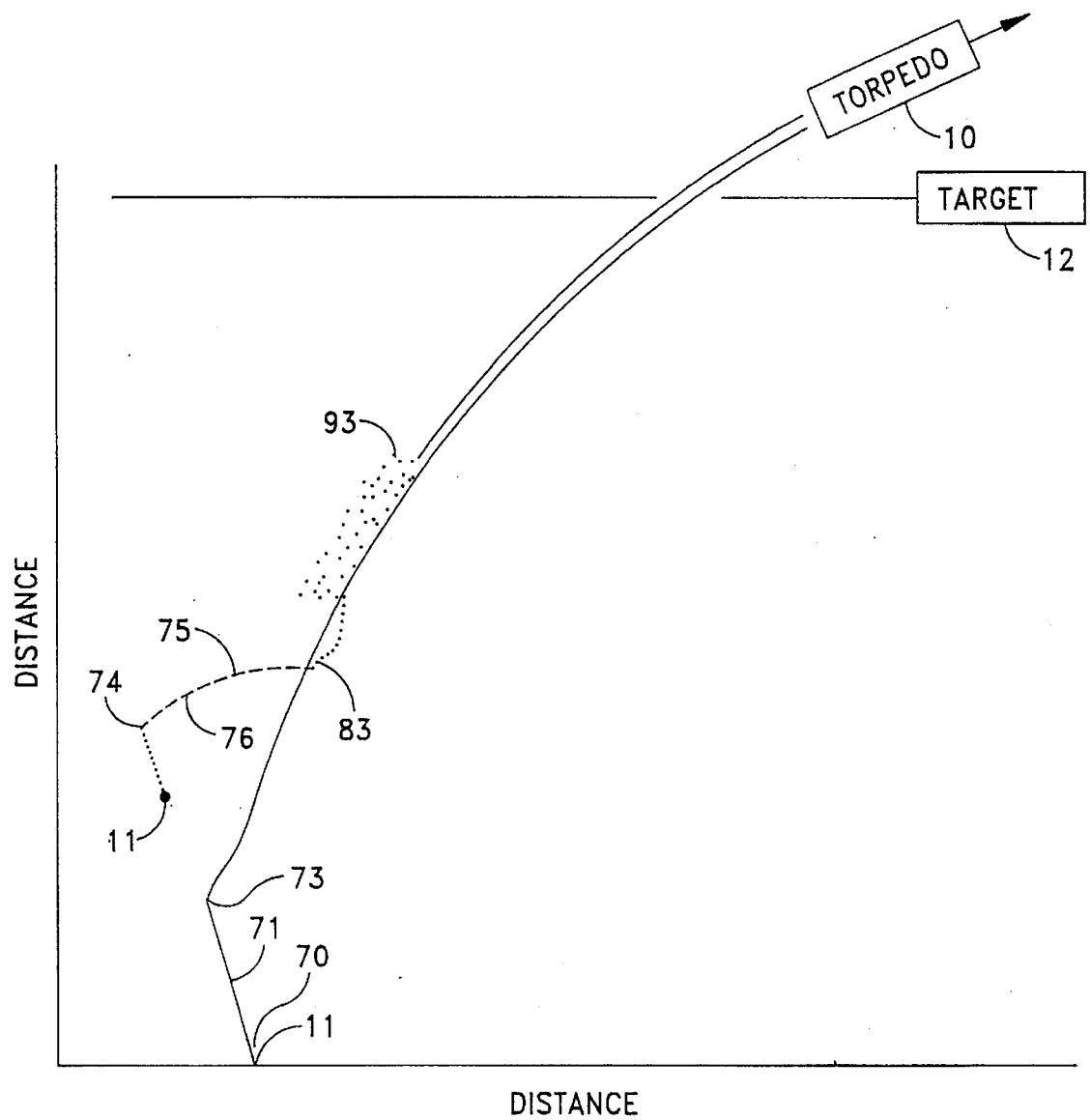
FIGS. 11A, 11B and 11C depict the operation of the guidance system shown in FIG. 3.

FIG. 11A depicts a sample trajectory for a torpedo 10 as it moves from a launcher 11 represented at position 11 to a moving target. In this particular example it is assumed that the launcher is stationary, that target tracking commenced at a position 70 and that the torpedo 10 was launched along a track 71 essentially on a course of −45°. The torpedo initially advances along the track 71 independently of the control system in FIG. 3 until the torpedo reaches some minimal range indicated at position 73.

Figure 11B:
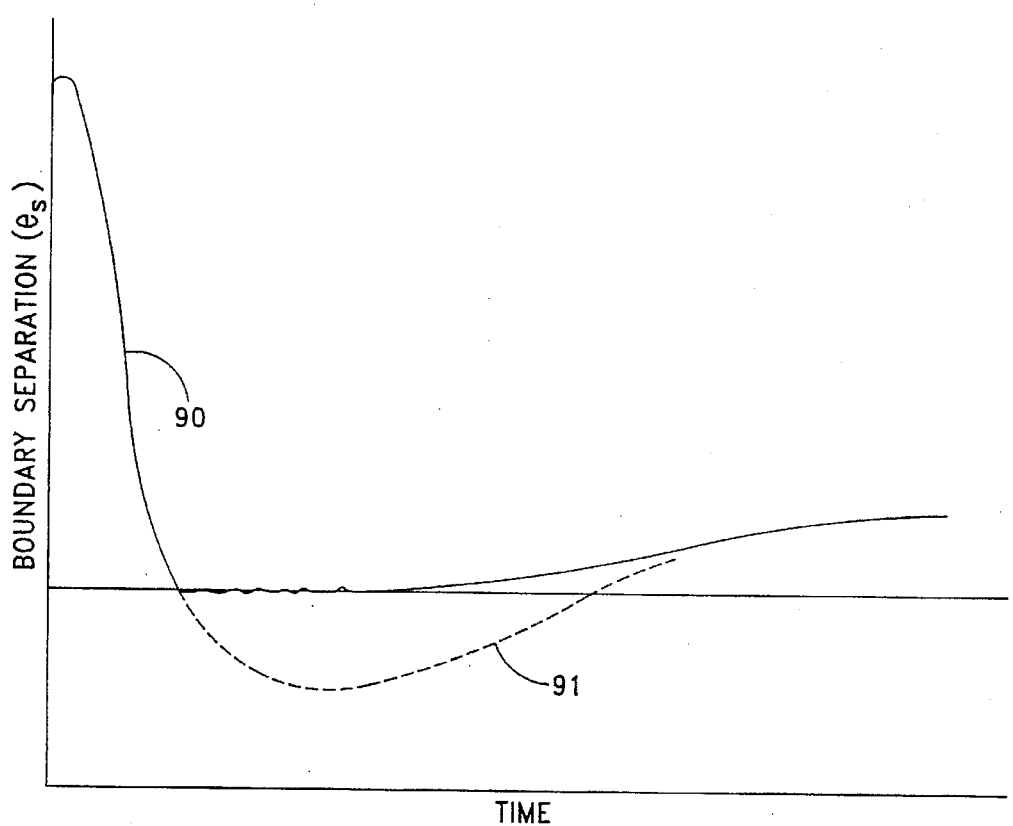

When the torpedo is at the position 73, its guidance point is at the position 74. In this graph, each dot represents one sample cycle. As the target moves to the right in FIG. 11A and as the control system in FIG. 3 takes over, it applies controls that move the guidance point through a series of positions 75 to direct the torpedo 10 and place its guidance point on the bearing to the target. Referring to this operation in more detail, the control circuit in FIG. 3 takes control at a point 73 during the trajectory shown in FIG. 11A. This is at a time $t_r=0$ represented in both FIGS. 11B and 11C that depict the time variations of the boundary separation and the $e_{gp}$ signals. FIG. 11B is a plot of boundary separation, that is the position of the torpedo 10 with respect to the forbidden zone 16. In this particular description, a negative excursion of the boundary separation value denotes an incursion of the torpedo into the forbidden zone. In FIG. 11B, the solid line 90 represents the boundary separation when both the primary and secondary goal error units are utilized in accordance with this invention; the dashed line 91 shows a deviation from this operation when only the secondary goal error unit is utilized (i.e., no primary control is utilized). This deviation represents an incursion into the forbidden zone 16 and operations that could interrupt target tracking.

Figure 11C:
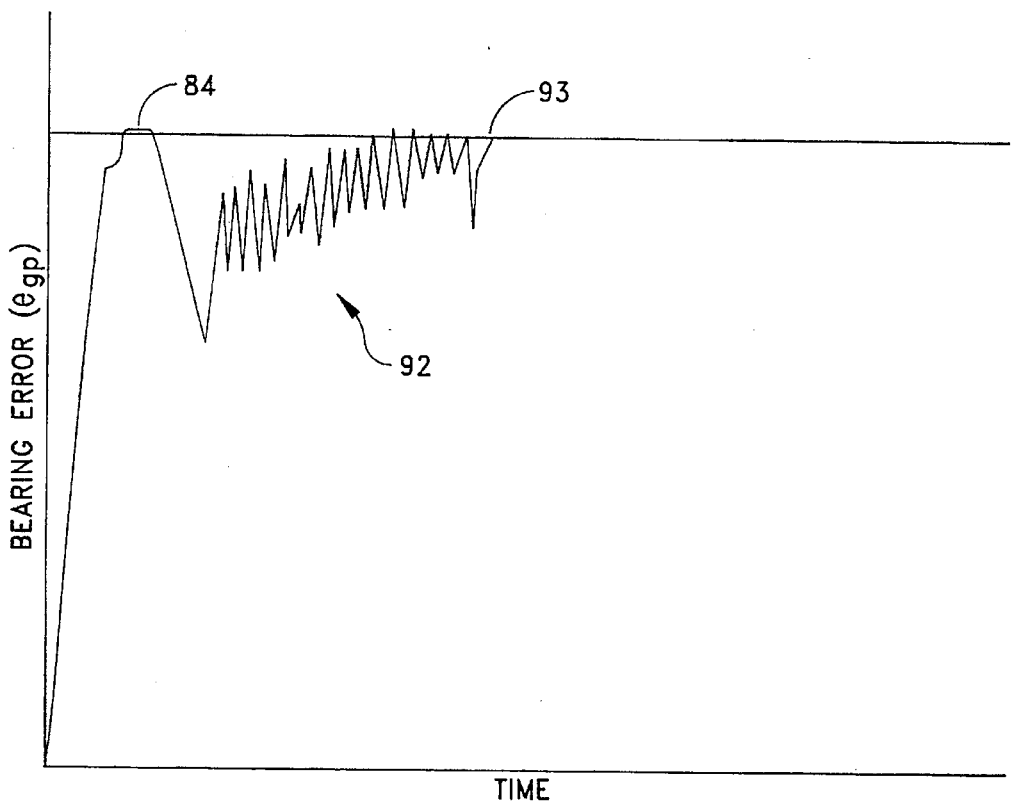

FIG. 11C depicts the variation of the bearing error $e_{gp}$. Initially the control system 22 produces commands which result in a clockwise turn as shown by the guidance point movement over the interval as the guidance point moves to position 83. As the guidance point approaches the bearing line, the $e_{gp}$ signal reaches an essentially zero value at point 84. Whereas without this invention the control system 22 would continue to issue the commands required to maintain the guidance point on the beam rider trajectory for the remainder of the torpedo's travel toward the target 12, this system issues a series of commands that vary the $e_{gp}$ error. Although the $e_{gp}$ error varies instantaneously over a range 92, the average value over several samples decreases to zero until the system stabilizes the $e_{gp}$ error at point 93. It is, however, through this range that the primary goal of avoiding any incursion into the forbidden zone 16 is met. Thereafter, the control system 22 responds to the secondary goal error unit 32B while the torpedo proceeds toward the target 12.

Thus in accordance with this invention, a control system 22 as shown in FIG. 3 combines a contact bearing, and a torpedo guidance point bearing to form a plurality of error functions and derivatives thereof. The hierarchical structure of the control system with its primary and secondary goals enable the control system to mediate between two competing goals, namely: maintaining the position of the torpedo outside a predetermined zone along the bearing from the launching vehicle and the target and maintaining the position of the torpedo along a beam rider trajectory that is along that same bearing by placing a guidance point for the torpedo on that bearing.

A control system constructed in accordance with this invention emulates operations that reflect heuristic considerations through the utilization of a rule based expert system that includes a knowledge base that reflects the thinking process of a human. Moreover, the control system has the capability of mediating between two competing goals and automatically generating and issuing control commands.

More specifically, various signals are sampled on a regular iterative basis, so data from two successive sets of signals also provides the rate of change of any angle these signals represent. The fuzzification unit 33 uses corresponding sensed variable membership functions to encode the inputs obtained during one iteration into one or more sensed linguistic variables based on a hierarchical structure by which a primary goal is met in one set of operating conditions and a secondary goal is met in other operating conditions. The multi-goal rule based unit 34 converts these selected sensed linguistic variables into one or more control output linguistic variables. The control system selects control output membership functions of a control output membership function set that then can be combined by diverse procedures to obtain a control signal. Command conditioning prevents the control unit 22 from directing the objects such as a torpedo in an inappropriate direction and, in certain operating conditions, provides a gain or other modification to the command signal necessary to obtain good control with different tactical parameters.

This invention has been described in terms of block diagrams, processes and graphical analysis that will enable anyone of ordinary skill in control systems art to construct a specific embodiment of such a control system. It will be apparent that many modifications can be made to the disclosed apparatus without departing from the invention. Therefore, it is the intent of the appended claims to cover all such variations and modifications as come within the true spirit and scope of this invention.

What is claimed is:

1. A hierarchical control system for guiding a steerable object from a launching vehicle toward a target in response to any of competing sets of multiple goal control rules based upon signals from sensing means corresponding to bearings from the launching vehicle to the steerable object and to the target, said hierarchical control system comprising:

first error means for generating first goal sensed variable signals in response to the signals from said sensing means;

second error means for generating second goal sensed variable signals in response to the signals from said sensing means;

sensed variable membership means including a plurality of sensed variable membership functions for converting the first and second sensed variable signals based on the corresponding first and second sensed variable membership functions into at least first and second sensed linguistic variables;

control output membership means for producing a plurality of control output membership functions;

multi-goal rule based means including competing multiple output control rules interposed between said sensed variable membership means and said control output membership means for selecting at least one of said control output membership functions in accordance with one of the competing multiple output control rules selected by said multi-goal rule based means in response to the first goal sensed variable signals;

guidance command generating means for generating a guidance command in response to the selection by said multigoal based means; and a guidance command transfer means for transferring the guidance command to the steerable object, thereby guiding the steerable object from the launching vehicle toward the target.

2. A hierarchical control system as recited in claim 1 wherein said first error means additionally includes means for determining the position of the steerable object based on an angular difference between a predetermined angular offset from the bearing between the launching vehicle and the target and a sensed angular offset between the sensed bearings from the launching vehicle to the target and the steerable object respectively and means for determining the rate of change of the angular difference and wherein said first goal sensed variable linguistic variables and said first goal sensed variable membership functions correspond to the angular difference and the rate of change of the angular difference.

3. A hierarchical control system as recited in claim 2 wherein the steerable object includes a guidance point spaced a predetermined distance from the steerable object along its longitudinal axis of motion and said sensing means produces bearings to said steerable object and said target and to said guidance point, said second error means for selecting said second goal sensed variable linguistic variables and said corresponding second goal sensed variable membership functions based upon the difference between the bearings from the launching vehicle to said guidance point and to the target and the rate of change of the difference between the bearings to the steerable object and the target.

4. A hierarchical control system as recited in claim 3 wherein said angular difference determining means additionally includes means for defining a zone about the bearing from the launching vehicle to the target, said angular difference determining means generating a bearing error signal corresponding to the bearing signal difference between the bearings from the launching object to each of said steerable object and the target to determine whether the steerable object is located within the zone and a rate of change error signal corresponding to the rate of change of the difference between the bearings.

5. A hierarchical control system as recited in claim 4 wherein said zone defining means defines the zone as a function of range from the launching vehicle to the steerable object.

6. A hierarchical control system as recited in claim 5 wherein said sensed variable membership means assigns a value to the selected first goal sensed linguistic variables in response to the magnitude of the first goal sensed variable signals.

7. A hierarchical control system as recited in claim 1 wherein said multi-goal rule based means includes means for selecting control output linguistic variables based upon competing first and second goals according to sets of selected logical rules based upon the selected sensed linguistic variables corresponding to the selected first or second goal.

8. A hierarchical control system as recited in claim 7 wherein said sensed variable membership means assign values to each selected sensed linguistic variable in response to the magnitude of said sensed first and second variable signals and said multi-goal rule based means scales each control output membership function in response to the associated assigned values.

9. A hierarchical control system as recited in claim 8 wherein said guidance command generating means includes means for combining a plurality of the scaled output control membership functions into said guidance command.

10. A hierarchical control system as recited in claim 9 comprises constraint means for limiting the range of guidance commands from said guidance command generating means.

11. A hierarchical control system as recited in claim 10 wherein said guidance command generating means additionally comprises conditioning means for adjusting the gain of the guidance command in response to different tactical parameters.

12. A hierarchical control system as recited in claim 1 wherein said sensed variable membership means stores first and second sets of sensed variable membership functions corresponding to the first and second competing goals and selects sensed linguistic variables based upon the first and second goal sensed variable signals and corresponding sensed variable membership functions, wherein said control output membership means stores a set of control output membership functions and wherein said multi-goal rule based means combines the selected sensed linguistic variables to produce at least one control output linguistic variable and a control output based upon the control output membership functions corresponding to the at least one control output linguistic variable.

13. A hierarchical control system as recited in claim 12 wherein said sensed variable membership means includes means for selecting a plurality of the sensed linguistic variables corresponding to each of the first and second competing goals and said multi-goal rule based selection means includes means for selecting a control output linguistic variable in response to each combination of the selected sensed linguistic variables according to a set of logical rules selected in response to the first goal sensed signals and means for combining said control output membership functions corresponding to the selected control output linguistic variable.

14. A hierarchical control system as recited in claim 13 wherein said combining means includes means for obtaining the centroid of the combined control output membership functions.

15. A hierarchical control system as recited in claim 13 wherein said first and second error means and said sensed variable membership means assign a value to each selected sensed linguistic variable and said combining means includes means for scaling each said selected control output membership function by a scaling factor corresponding to the assigned values.

16. A hierarchical control system as recited in claim 15 wherein said combining means includes means for combining said scaled control output membership functions according to a centroid method.

17. An iterative method for guiding a steerable object from a launching vehicle to a target in response to a plurality of competing goals for determining guidance wherein each iteration comprises the steps of:

generating first sensed bearings from the launching vehicle to the steerable object and to the target and second sensed bearings that indicate the position of the steerable object with respect to a predetermined zone of positions;

selecting at least one of a first set of sensed variable membership functions in response to the first sensed bearings;

determining which of the multiple competing goals is to control guidance in response to the second sensed bearings;

selecting at least one of the first and second sets of predetermined sensed linguistic variables in response to the second sensed bearings based upon predetermined goal selection rules;

selecting at least one control output linguistic variable from a predetermined set of control output linguistic variables according to predetermined rules and in response to the selected sensed linguistic variables from the first set when the second sensed bearings indicate that the steerable object is proximate or inside the predetermined zone and in response to the second set when the second sensed bearings indicate that the steerable object is outside the predetermined zone;

generating a guidance command for controlling the steerable object in response to the control output linguistic variables selection; and transferring the guidance command to the steerable object.

18. A method as recited in claim 17 wherein said selection of sensed linguistic variables includes using the first and second sensed bearings and first and second sets of sensed variable membership functions for selecting the sensed linguistic variables and wherein said generation of said guidance command includes using the selected control output linguistic variables to select corresponding control output membership functions and combining the selected control output member functions to produce the guidance command.

19. A method as recited in claim 18 wherein said generation of said first and second sensed bearings includes the steps of generating a first sensed variable signal corresponding to the location of the steerable object with respect to a predetermined zone about the bearing from the launching vehicle to the target, a second sensed variable signal corresponding to the rate of change of the location relative to the predetermined zone, a third sensed variable signal corresponding to the difference in the bearings to the steerable object and the target and a fourth sensed variable signal corresponding to a rate of change between the difference in the bearings from the launching vehicle to the steerable object and the target, each of the first and second sensed variable signals being classified as one of a plurality of the first sensed variable signals and each of the third and fourth sensed variable signals being classified as one of a plurality of the second sensed variable signals.

20. A method as recited in claim 18 wherein the steerable object is characterized by forward motion and has a first location thereon and a second location spaced from and ahead of the steerable object along a longitudinal axis of motion therethrough, said method further including the steps of generating a first bearing signal from the launching vehicle to the first location, a second bearing signal from the launching vehicle to the second location and a third bearing signal from the launching vehicle to the target;

said determining step including generating a guidance point error signal corresponding to the difference between the second and third bearing signals and a rate of change error signal corresponding to the rate of change of the differences between the first and third bearing signals; and said method additionally comprising generating a boundary separation error signal corresponding to the difference between the absolute value of the first and third bearing signals difference and a predetermined angular offset from the target bearing and a change of error signal corresponding to the rate of change of the boundary separation error signal.

21. A method as recited in claim 20 additionally comprising the step of determining a sign for the difference between the first and third bearing signals.

22. A method as recited in claim 21 wherein each of the sensed linguistic variables and associated functions in the first and second sets has a fixed plurality of members corresponding to different values of the corresponding sensed variables and each function for each member is programmable to vary said selection of the sensed linguistic variables in response to a given value of a sensed variable membership function.

23. A method as recited in claim 21 wherein the first and second sets of sensed linguistic variables and associated membership functions, each said set having a fixed plurality of linguistic variables and associated membership functions corresponding to different values of the corresponding sensed variables and each of said sensed variable membership functions being programmable to vary said selection of the sensed linguistic variables in response to a particular value of a sensed variable membership function and said sensed variable membership functions being overlapped.

24. A method as recited in claim 23 wherein said selection of a control output linguistic variable and associated membership function is made according to selected predetermined logical rules based upon the selected individual sensed linguistic variables that additionally determine which of the competing goals will determine the guidance.

25. A method as recited in claim 24 wherein said selection additionally includes the steps of identifying a plurality of control output linguistic variables and associated membership functions from the control output membership function set in response to multiple rules and of combining said membership functions associated with said plurality of the control output linguistic variables.

26. A method as recited in claim 25 wherein said step of combining control output membership functions includes scaling the selected control output membership functions in response to the magnitudes of the selected sensed variable signals corresponding to the selected goal.

27. A method as recited in claim 26 wherein said guidance command generating step includes combining the multiple scaled controlled output membership functions into the guidance command.

28. A method as recited in claim 27 wherein said guidance command generating step includes the step of testing the guidance command against predetermined limits thereby to constrain the resulting guidance command.

29. A method as recited in claim 27 wherein said guidance command generating step includes the step of adjusting the magnitude of the guidance command through utilization of a gain which is a function of ongoing tactical parameters.

30. A method as recited in claim 19 wherein the first set of sensed linguistic variables and associated membership function sets correspond to the first and second sensed variable signals and the second set of sensed linguistic variables, and associated membership function sets corresponds to the third and fourth sensed variable signals, each of said sets of sensed linguistic variables having a fixed plurality of linguistic variables and membership functions corresponding to different values of the corresponding sensed variables, at least one of said membership functions overlapping another membership function whereby the classification of certain values of the sensed variables can select multiple sensed linguistic variables in a given sensed linguistic variable set and wherein said selection of the control output linguistic variables additionally includes the steps of identifying a plurality of the control output linguistic variables and the associated membership functions from the control output sets in response to multiple rules and of combining the selected control output membership functions for subsequent conversion to said guidance command.

31. A method as recited in claim 30 wherein said guidance command includes the summation of the selected control output membership functions by a centroid weighted method.

32. A method as recited in claim 31 wherein each selected sensed variable membership function produces a scaling factor in response to the magnitude of the corresponding sensed variable signal and wherein each selected control output membership function is scaled by an amount corresponding to the minimum scaling factor value of the corresponding sensed linguistic variable producing the control output membership function.

* * * * *